United States Patent
Chen et al.

(10) Patent No.: US 10,557,082 B2
(45) Date of Patent: *Feb. 11, 2020

(54) LIQUID CRYSTAL COMPOSITION AND APPLICATION THEREOF

(71) Applicant: BEIJING BAYI SPACE LCD TECHNOLOGY CO., LTD, Beijing (CN)

(72) Inventors: Maoxian Chen, Beijing (CN); Haiguang Chen, Beijing (CN); Shihong Chu, Beijing (CN); Tianmeng Jiang, Beijing (CN); Xin Wei, Beijing (CN); Lin Zhang, Beijing (CN); Huiqiang Tian, Beijing (CN); Qinghua Li, Beijing (CN); Jin Yuan, Beijing (CN); Yunpeng Guo, Beijing (CN); Xuehui Su, Beijing (CN)

(73) Assignee: BEIJING BAYI SPACE LCD TECHNOLOGY CO., LTD, Beijing (CN)

(*) Notice: Subject to any disclaimer, the term of this patent is extended or adjusted under 35 U.S.C. 154(b) by 73 days.

This patent is subject to a terminal disclaimer.

(21) Appl. No.: 15/536,092

(22) PCT Filed: Nov. 27, 2015

(86) PCT No.: PCT/CN2015/095740
§ 371 (c)(1),
(2) Date: Jun. 14, 2017

(87) PCT Pub. No.: WO2016/145907
PCT Pub. Date: Sep. 22, 2016

(65) Prior Publication Data
US 2018/0044592 A1 Feb. 15, 2018

(30) Foreign Application Priority Data
Mar. 13, 2015 (CN) .......................... 2015 1 01119008

(51) Int. Cl.
C09K 19/30 (2006.01)
C09K 19/20 (2006.01)
C09K 19/02 (2006.01)
C09K 19/34 (2006.01)
C09K 19/04 (2006.01)
G02F 1/1343 (2006.01)
G02F 1/139 (2006.01)

(52) U.S. Cl.
CPC ...... C09K 19/3066 (2013.01); C09K 19/0208 (2013.01); C09K 19/20 (2013.01); C09K 19/3001 (2013.01); C09K 19/3402 (2013.01); C09K 2019/0466 (2013.01); C09K 2019/0485 (2013.01); C09K 2019/3422 (2013.01); G02F 1/1396 (2013.01); G02F 1/134363 (2013.01); G02F 2001/134372 (2013.01)

(58) Field of Classification Search
None
See application file for complete search history.

(56) References Cited

U.S. PATENT DOCUMENTS

| 4,788,363 | A | * | 11/1988 | Takatsu | C07C 13/28 252/299.5 |
| 8,197,709 | B2 | | 6/2012 | Lietzau et al. | |
| 8,404,150 | B2 | * | 3/2013 | Wittek | C09K 19/3098 252/299.6 |
| 2017/0335189 | A1 | * | 11/2017 | Chen | C09K 19/44 |
| 2017/0349830 | A1 | * | 12/2017 | Jiang | G02F 1/1333 |
| 2017/0349831 | A1 | * | 12/2017 | Jiang | C07D 309/06 |
| 2018/0148398 | A1 | * | 5/2018 | Jiang | C07C 43/225 |

FOREIGN PATENT DOCUMENTS

| CN | 102050708 | A | | 5/2011 |
| CN | 103351873 | A | | 10/2013 |
| CN | 103740377 | A | | 4/2014 |
| CN | 103937508 | A | | 7/2014 |
| CN | 104130781 | A | | 11/2014 |
| CN | 104774623 | A | | 7/2015 |
| JP | 10291945 | A | * | 11/1998 |
| JP | 2005232455 | A | * | 9/2005 |
| WO | WO-2009100810 | A1 | | 8/2009 |

OTHER PUBLICATIONS

English translation of JP10291945. (Year: 1998).*
English translation of JP2005232455. (Year: 2005).*
International Search Report (in English and Chinese) and Written Opinion of the International Searching Authority (in Chinese) issued in PCT/CN2015/095740, dated Jan. 19, 2016; ISA/CN.
International Search Report (in English and Chinese) and Written Opinion of the International Searching Authority (in Chinese) issued in PCT/CN2015/092665, dated Jan. 4, 2016; ISA/CN.

* cited by examiner

Primary Examiner — Cynthia H Kelly
Assistant Examiner — Anna Malloy
(74) Attorney, Agent, or Firm — Harness, Dickey & Pierce, P.L.C.

(57) ABSTRACT

A liquid crystal composition and use thereof in the liquid crystal display field. The liquid crystal composition includes, in percentages by weight, 5-40% of one or more compounds represented by general formula I, 2-30% of one or more compounds represented by general formula II, and 20-70% of one or more compounds represented by general formula III, and may further include 4-30% of one or more compounds represented by general formula IV and/or 5-25% of one or more compounds represented by general formulas V to IX. The combined use of the above-mentioned compounds can effectively reduce the rotational viscosity of the liquid crystal composition, improve related properties of the mixed liquid crystal, and thus reduce the response time thereof. The liquid crystal composition can be used for a fast-response liquid display in a variety of display modes.

10 Claims, No Drawings

LIQUID CRYSTAL COMPOSITION AND APPLICATION THEREOF

CROSS REFERENCE TO RELATED APPLICATIONS

This application is a U.S. National Phase Application under 35 U.S.C. 371 of International Application No. PCT/CN2015/095740 filed on Nov. 27, 2015 and published in Chinese as WO 2016/145907 on Sep. 22, 2016. This application claims priority to Chinese Patent Application No. 2015101119008 filed Mar. 13, 2015. The entire disclosures of all of the above applications are incorporated herein by reference.

FIELD OF THE INVENTION

The present invention relates to the liquid crystal field, and particularly relates to a liquid crystal composition and use thereof in the liquid crystal display field.

BACKGROUND OF THE INVENTION

Currently, liquid crystal has been widely applied in the information display field, and has also made some progress in optical communication applications. In recent years, the application field of liquid crystal compounds has been significantly broadened to various types of display devices, electro-optical devices, electronic components, sensors and the like. Nematic liquid crystal compounds have been most widely used in flat panel displays, particularly in TFT active matrix systems.

Liquid crystal display has gone through a long path of development since the discovery of liquid crystals. Particularly since the seventies, due to the development of large-scale integrated circuits and liquid crystal materials, the application of liquid crystals has made a breakthrough development in terms of display. Super Twisted Nematic (STN) mode proposed successively by T. Scheffer et al. in 1983-1985 and an Active Matrix (AM) mode proposed by P. Brody in 1972 were re-adopted. Conventional TN-LCD technology has been developed into STN-LCD and TFT-LCD technologies. Although the number of STN scanning lines can reach 768 or greater, there are still problems, such as response speed, viewing angle and gray scale, when the temperature rises. Therefore, for a large area, high information content, color display, an active matrix display mode becomes the first choice.

There are two types of "active matrix" including: 1. a metal oxide semiconductor (MOS) on a silicon wafer as a substrate; and 2. a thin film transistor (TFT) on a glass plate as a substrate.

Monocrystalline silicon as a substrate material limits the display size due to the fact that there were many problems occurring at junctions of each part of a display device or even a module assembly. Accordingly, the second type of thin film transistor is a promising active matrix type. The photoelectric effect utilized is generally the TN effect. A TFT includes a compound semiconductor, such as CdSe, or a TFT based on polycrystalline silicon or amorphous silicon.

Currently, the LCD product technologies have been well established and successfully solved technical problems regarding the viewing angle, resolution, color saturation, brightness, etc., and the display performance thereof has been close to or superior to that of CRT displays. Large-size and small-to-medium-size LCDs have gradually dominated the flat panel displays in respective fields. However, due to the limitation of (the high viscosity of) the liquid crystal material itself, the response time becomes a principal factor affecting high-performance displays.

In particular, the response time of a liquid crystal is limited by the rotational viscosity γ1 and the elastic constant of the liquid crystal. Therefore, reducing the rotational viscosity of a liquid crystal composition and increasing the elastic constant have a significant effect on reducing the response time of the liquid crystal display and accelerating the response speed of the liquid crystal display.

SUMMARY OF THE INVENTION

An object of the present invention is to provide a liquid crystal composition, and the liquid crystal composition has a low rotational viscosity and a large elastic constant, and is presented as having a shorter response time, so that the problem of the slow response of the liquid crystal display is effectively solved.

In order to achieve the above object, the following technical solution is specifically adopted:

a liquid crystal composition, comprising, in percentages by weight, 5-40% of one or more compounds represented by general formula I, 2-30% of one or more compounds represented by general formula II, and 20-70% of one or more compounds represented by general formula III; preferably comprising 9-30% of one or more compounds represented by general formula I, 3-26% of one or more compounds represented by general formula II, and 36-67% of one or more compounds represented by general formula III,

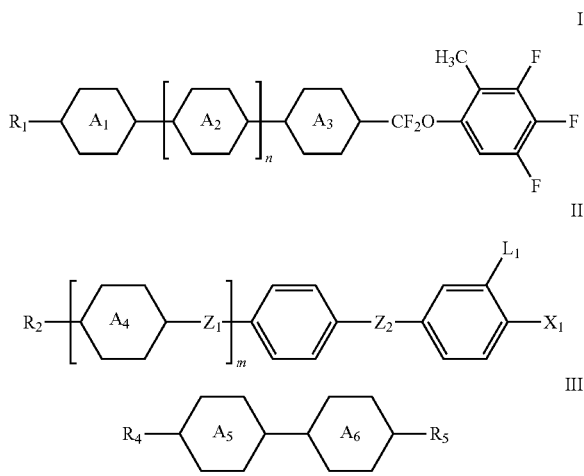

wherein $R_1$ independently represents a $C_1$-$C_{12}$ linear alkyl group or a $C_2$-$C_{12}$ linear alkenyl group; $R_2$ independently represents a $C_1$-$C_{12}$ linear alkyl group, a $C_1$-$C_{12}$ linear alkoxy group or a $C_2$-$C_{12}$ linear alkenyl group; $R_4$ and $R_5$ each independently represent an unsubstituted $C_1$-$C_{12}$ linear alkyl group or a $C_1$-$C_{12}$ linear alkyl group having one or more non-adjacent $CH_2$ substituted with O, S or CH=CH;

$X_1$ independently represents F, Cl, CN, a $C_1$-$C_{12}$ linear alkyl group, a $C_1$-$C_{12}$ linear alkoxy group or a $C_2$-$C_{12}$ linear alkenyl group;

$Z_1$ and $Z_2$ each independently represent a single bond or an acetylenic bond, with at least one of $Z_1$ and $Z_2$ being an acetylenic bond;

$L_1$ independently represents H or F;

$A_1$, $A_2$ and $A_3$ each independently represent:

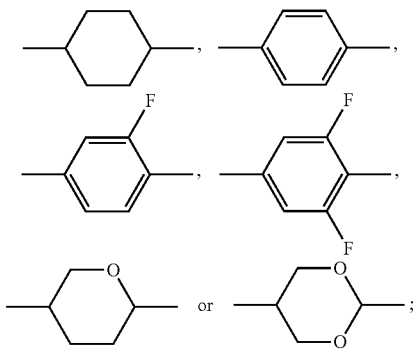

$A_4$ independently represents:

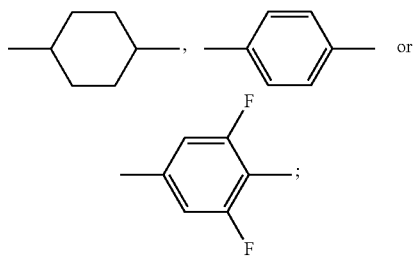

$A_5$ and $A_6$ each independently represent a trans-1,4-cyclohexylene group or a 1,4-phenylene group; and m and n each independently represent 0 or 1.

The liquid crystal composition of the present invention further comprises 0-30% by weight of a compound represented by general formula IV, preferably 4-30% by weight of a compound represented by general formula IV, and more preferably 4-24% by weight of a compound represented by general formula IV,

IV wherein $R_6$ and $R_7$ each independently represent a $C_1$-$C_{12}$ linear alkyl group or a $C_1$-$C_{12}$ linear alkyl group having one or more non-adjacent $CH_2$ substituted with O, S or CH=CH; and $A_7$ is selected from one of the following structures:

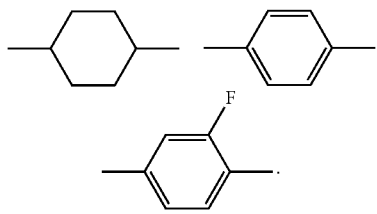

The liquid crystal composition of the present invention further comprises 0-30% by weight of compounds represented by general formulas V to IX, preferably 5-25% by weight of compounds represented by general formulas V to IX,

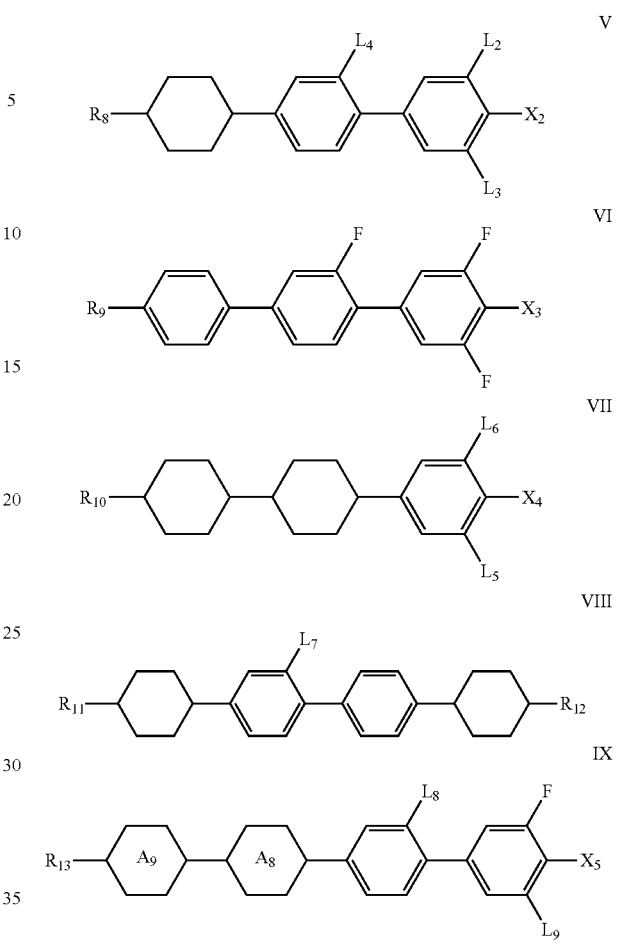

wherein $R_{10}$ independently represents a $C_1$-$C_{12}$ linear alkyl group or a $C_2$-$C_{12}$ linear alkenyl group; $R_8$, $R_9$ and $R_{11}$-$R_{13}$ each independently represent a $C_1$-$C_{12}$ linear alkyl group; $X_2$-$X_5$ each independently represent F, $CF_3$, $OCF_3$ or $OCF_2H$; $L_2$-$L_9$ each independently represent H or F; and $A_8$ and $A_9$ each independently represent:

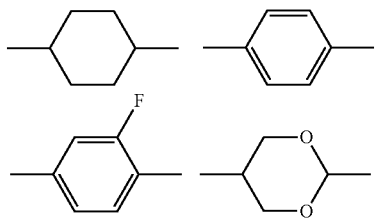

As an embodiment, the liquid crystal composition of the present invention comprises, in percentages by weight, 9-12% of one or more compounds represented by general formula I, 5-26% of one or more compounds represented by general formula II, 60-67% of one or more compounds represented by general formula III, and 5-24% of one or more compounds represented by general formula IV.

As another embodiment, the liquid crystal composition of the present invention comprises, in percentages by weight, 14-30% of one or more compounds represented by general formula I, 3-9% of one or more compounds represented by general formula II, 30-50% of one or more compounds represented by general formula III, 4-18% of one or more compounds represented by general formula IV, and 9-25% (preferably 9-23%) of one or more compounds represented by general formulas V to IX.

In the above-mentioned "one or more compounds represented by general formulas V to IX", where only one compound is selected, it is preferred to select compound VII or V, and the range of the amount thereof is suitably 9-15%; where a mixture of two compounds is selected, compounds VII and V are preferred, and the range of the amount thereof is suitably 9-23%; and where a mixture of three compounds is selected, compounds V, VIII and IX, or compounds V, VII and IX are preferred, and the range of the amount thereof is suitably 15-25%.

The compound represented by general formula I provided by the present invention is a polar compound containing a 2-methyl-3,4,5-trifluorobenzene structure and a difluoromethoxy bridge bond, the structure having a large dielectric anisotropy.

Particularly, the compound represented by general formula I is selected from one or more of the compounds represented by formulas I-A to I-U:

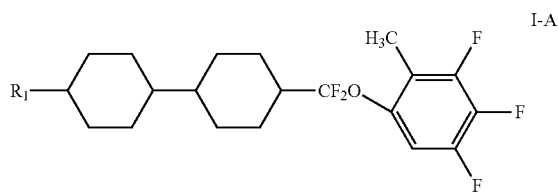
I-A

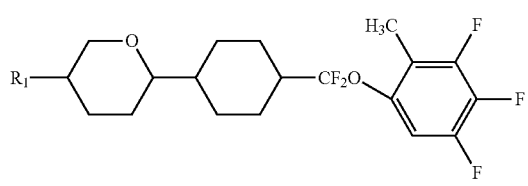
I-B

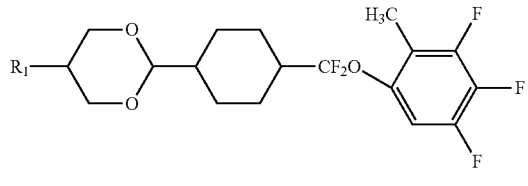
I-C

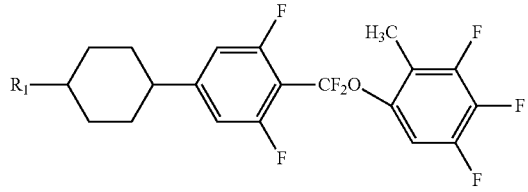
I-D

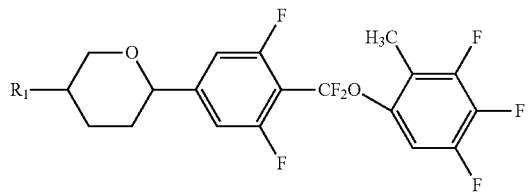
I-E

-continued

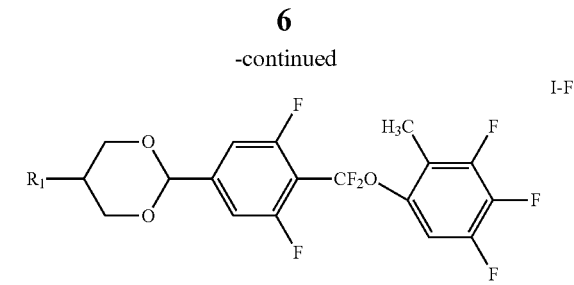
I-F

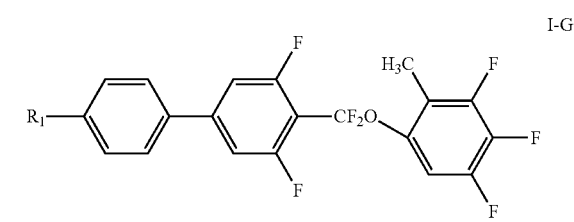
I-G

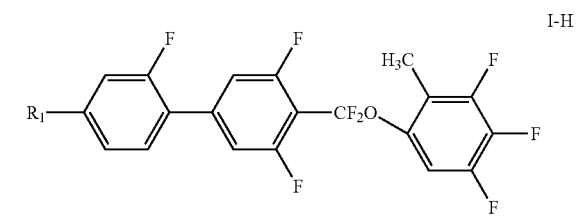
I-H

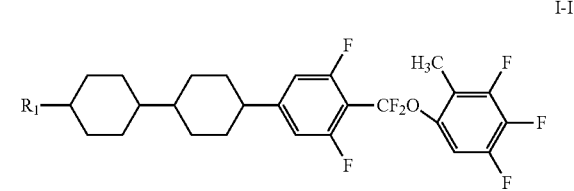
I-I

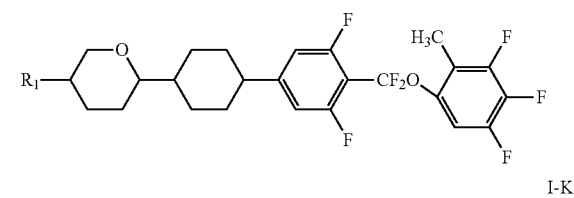
I-J

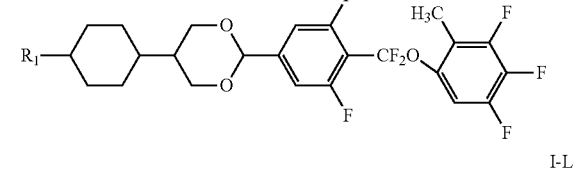
I-K

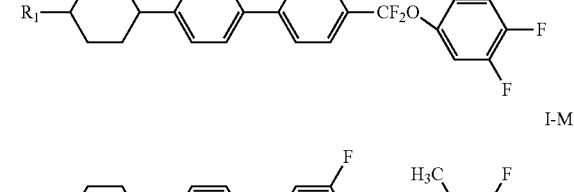
I-L

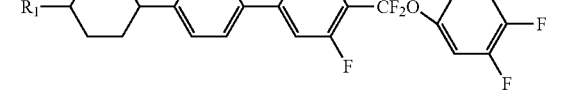
I-M

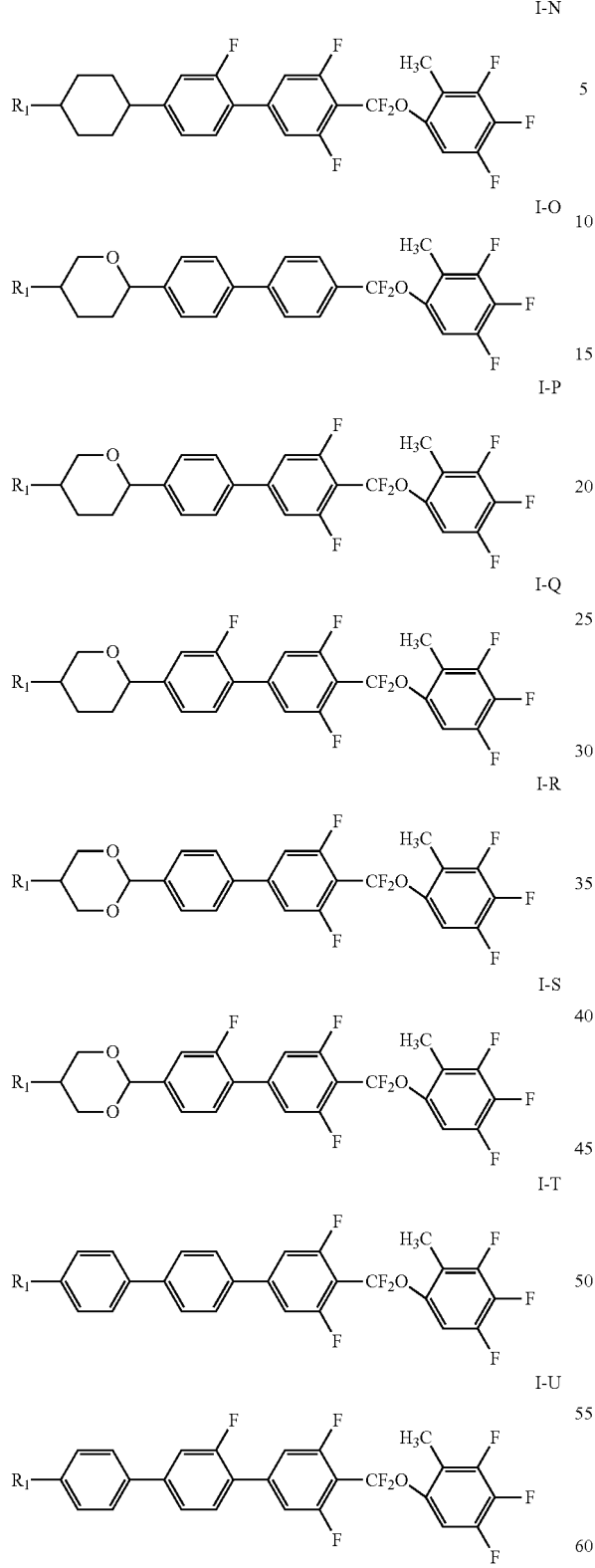
wherein R₁ independently represents a $C_1$-$C_7$ linear alkyl group.
Preferably, the compound represented by general formula I is selected from one or more of the compounds represented by formulas I-A-1 to I-U-4:

-continued
I-C-1
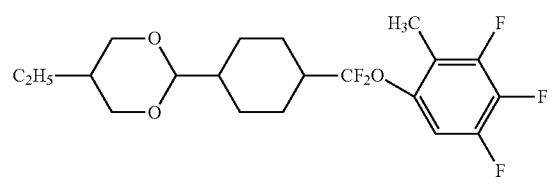
I-C-2
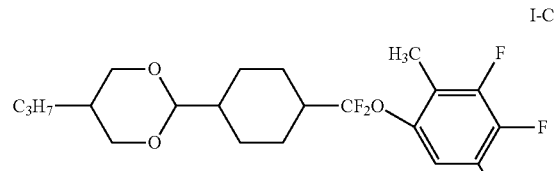
I-C-3
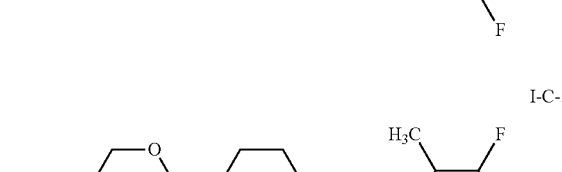
I-C-4
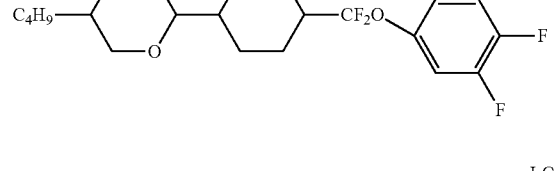
I-D-1
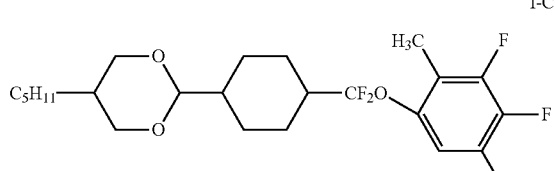
I-D-2
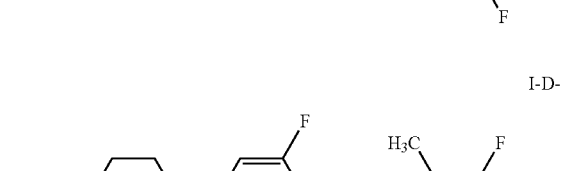
I-D-3
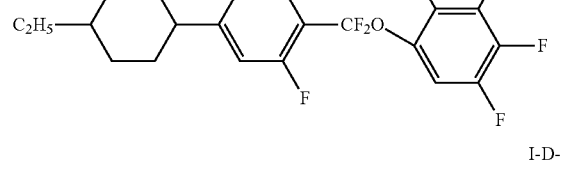
-continued
I-D-4
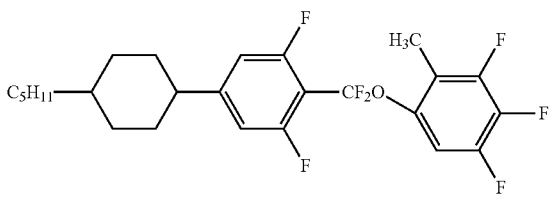
I-E-1
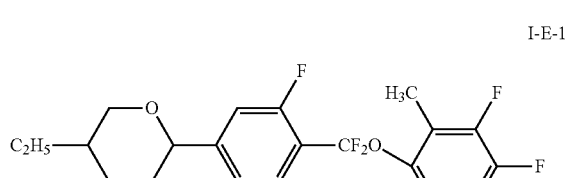
I-E-2
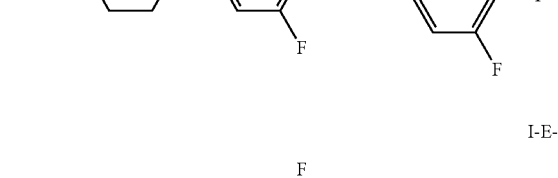
I-E-3
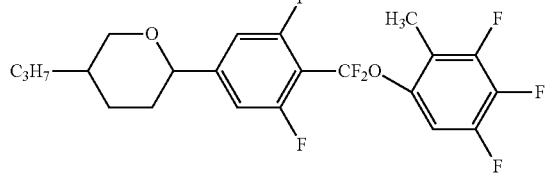
I-E-4
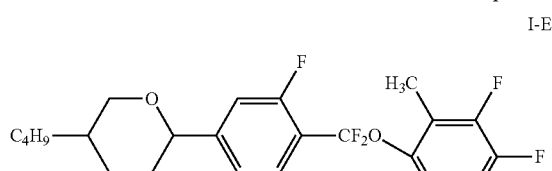
I-F-1
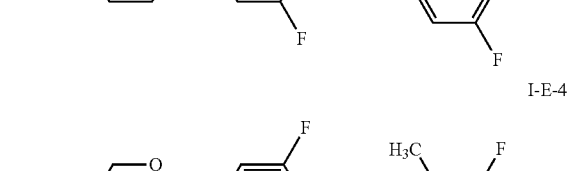
I-F-2
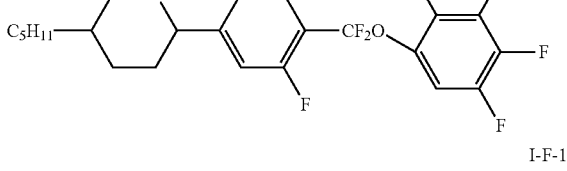

I-F-3
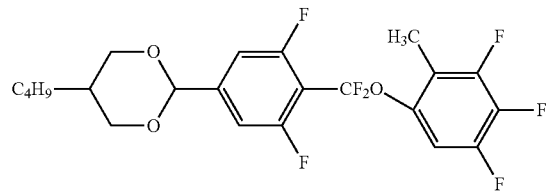
I-F-4
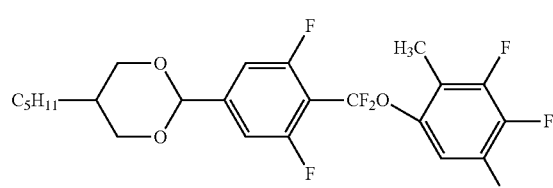
I-G-1
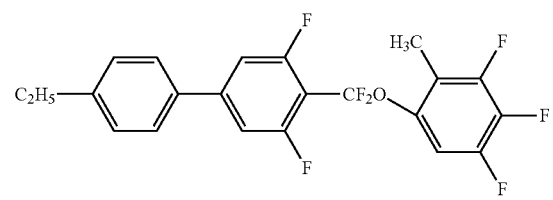
I-G-2
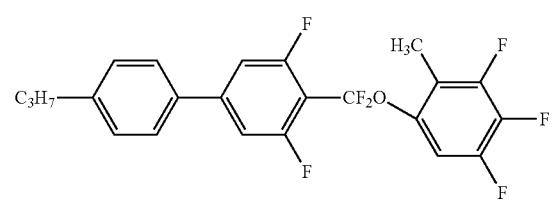
I-G-3
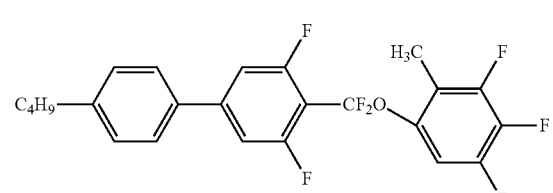
I-G-4
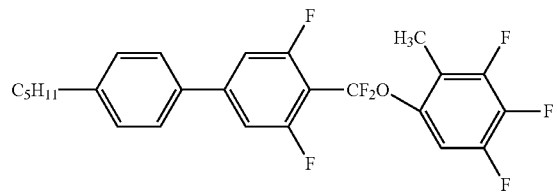
I-H-1
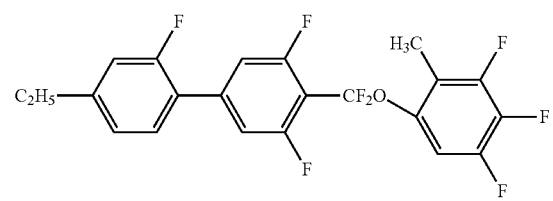
I-H-2
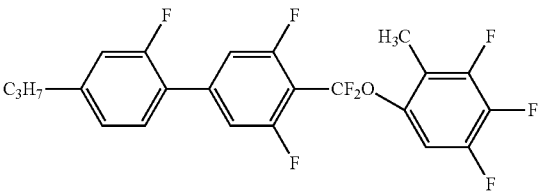
I-H-3
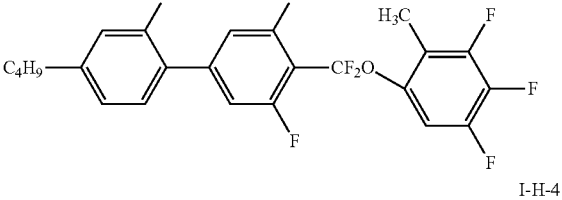
I-H-4
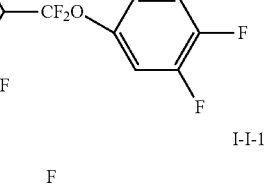
I-I-1
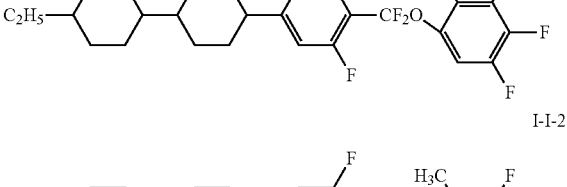
I-I-2
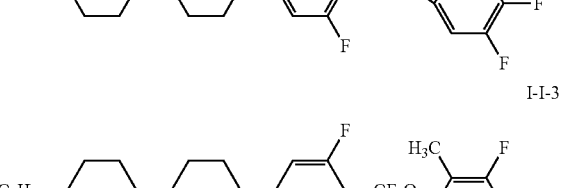
I-I-3
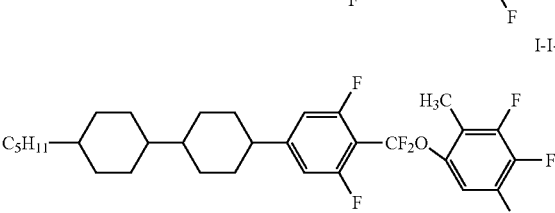
I-I-4
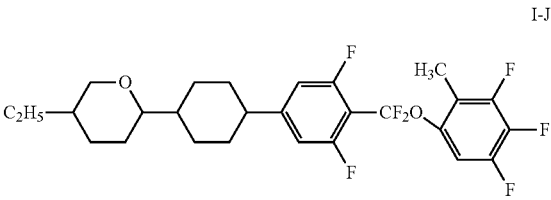
I-J-1

-continued

-continued

I-P-3, I-P-4, I-Q-1, I-Q-2, I-Q-3, I-Q-4, I-R-1, I-R-2, I-R-3, I-R-4, I-S-1, I-S-2, I-S-3, I-S-4, I-T-1, I-T-2

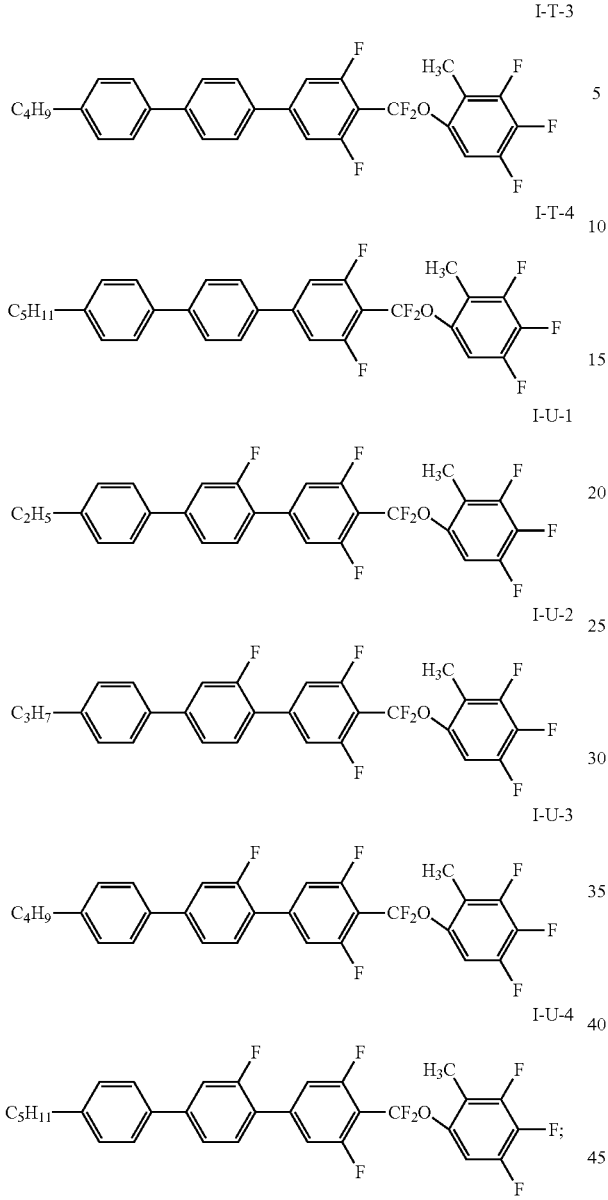

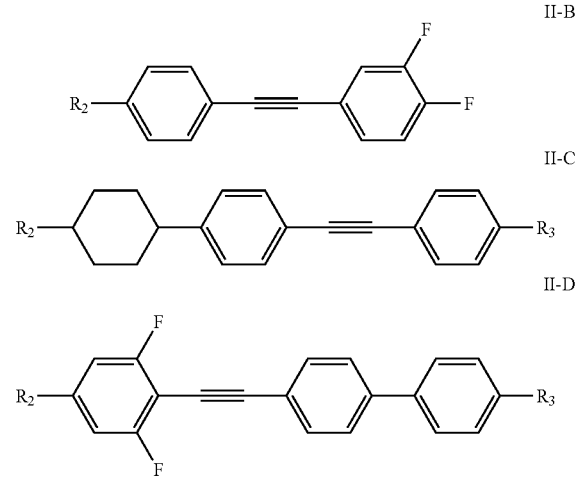

wherein $R_2$ independently represents a $C_1$-$C_7$ linear alkyl group or a $C_2$-$C_7$ linear alkenyl group; and $R_3$ independently represents a $C_1$-$C_7$ linear alkyl group, a $C_1$-$C_7$ linear alkoxy group or a $C_2$-$C_7$ linear alkenyl group.

Preferably, the compound represented by general formula II is selected from one or more of formulas II-A-1 to II-D-16:

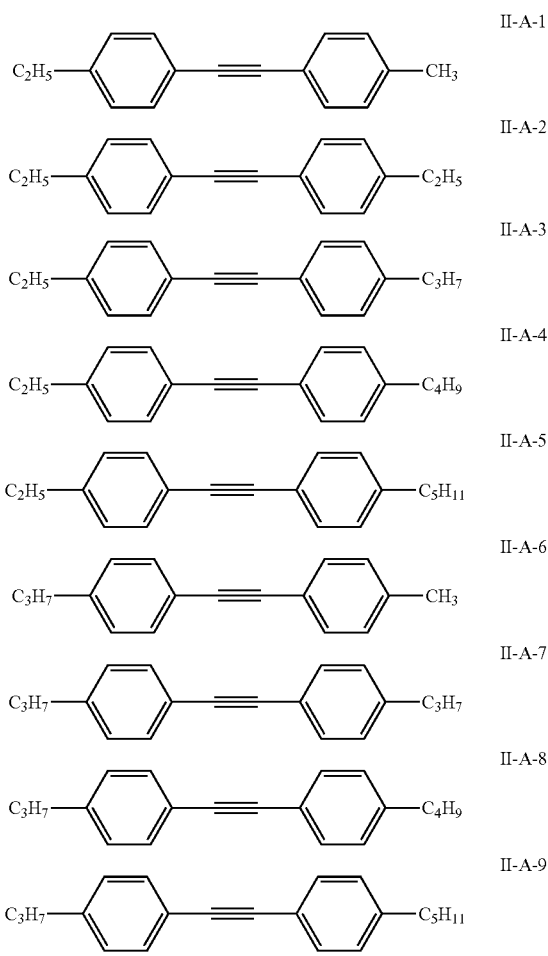

more preferably, the compound represented by general formula I is selected from one or more of formulas I-F-2, I-F-3, I-G-2, I-G-4, I-P-1, I-P-2, I-R-2, I-R-3, I-U-2 and I-U-4.

The acetylenic compound represented by general formula II provided by the present invention has a high optical anisotropy, and plays a significant role in increasing the optical anisotropy of the composition.

Particularly, the compound represented by general formula II is selected from one or more of formulas II-A to II-D:

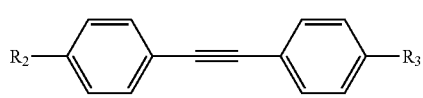

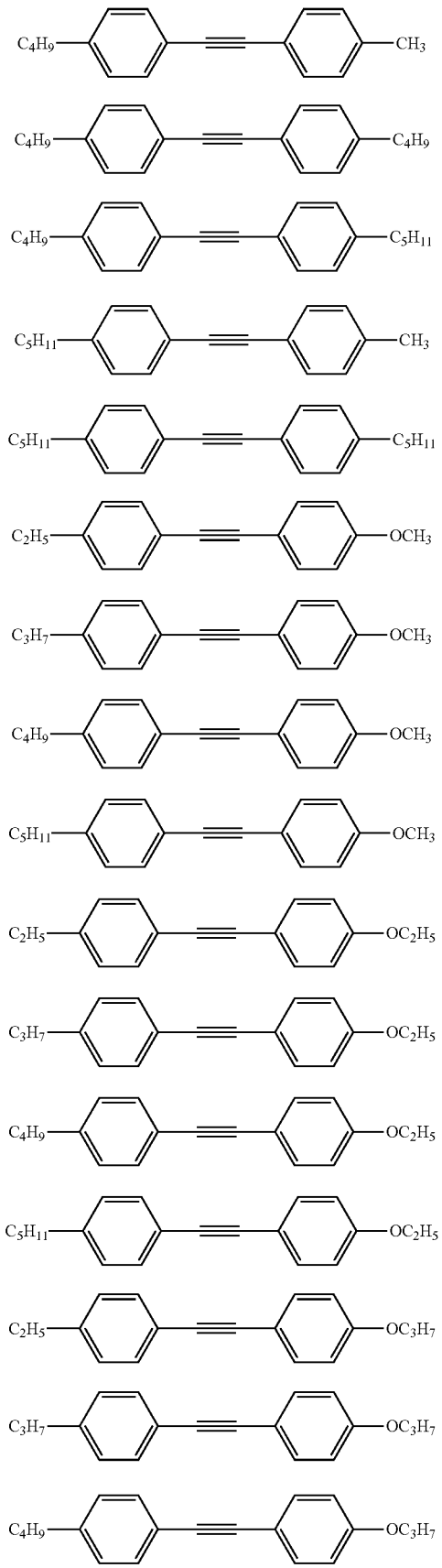
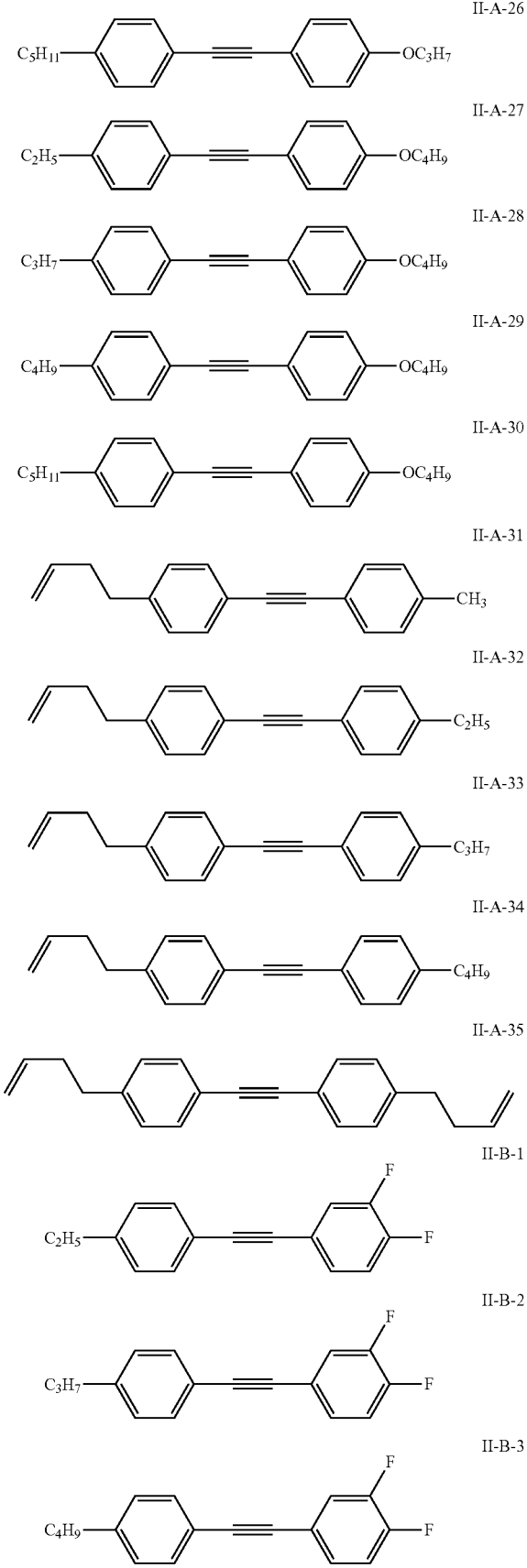

II-B-4
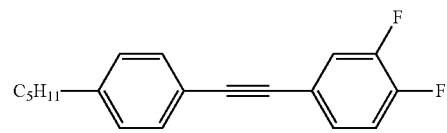
II-C-1
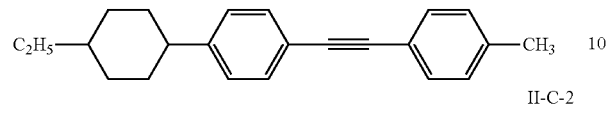
II-C-2
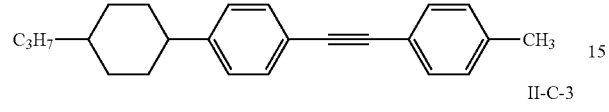
II-C-3
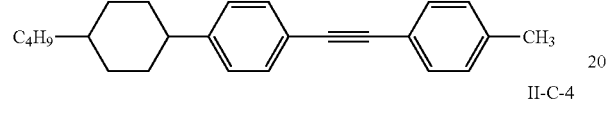
II-C-4
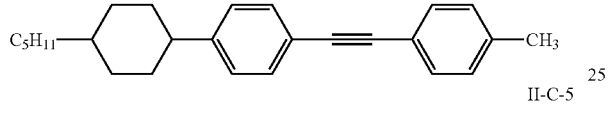
II-C-5
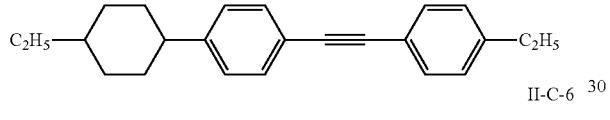
II-C-6
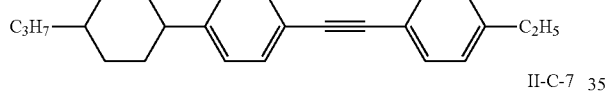
II-C-7
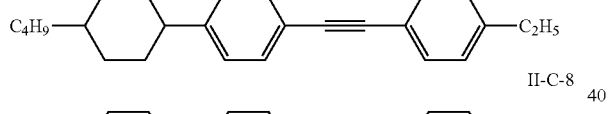
II-C-8
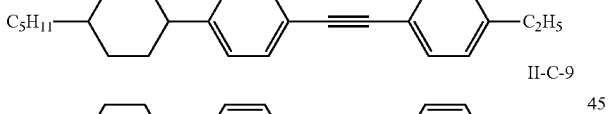
II-C-9
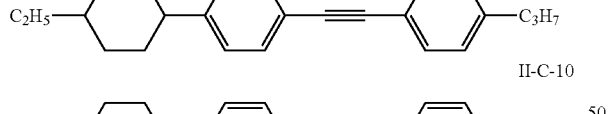
II-C-10
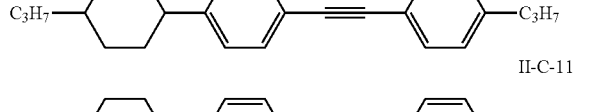
II-C-11
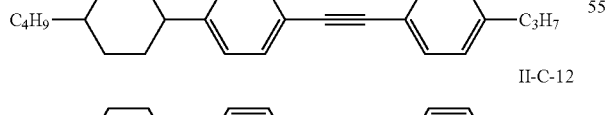
II-C-12
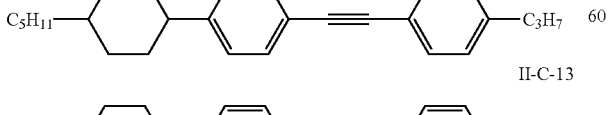
II-C-14
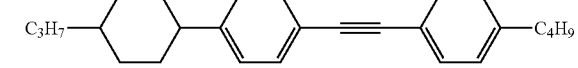
II-C-15
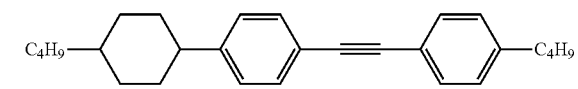
II-C-16
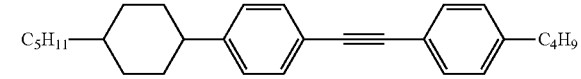
II-C-17
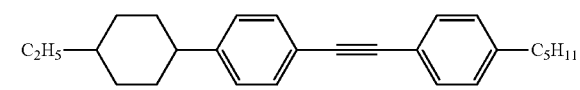
II-C-18
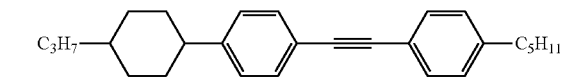
II-C-19
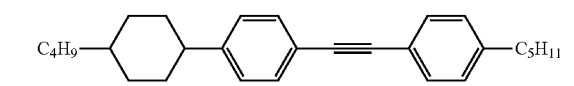
II-C-20
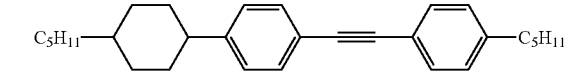
II-D-1
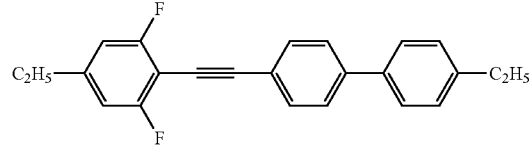
II-D-2
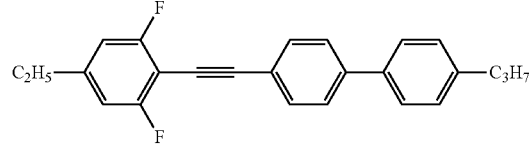
II-D-3
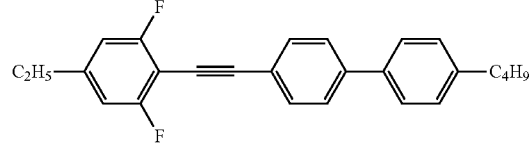
II-D-4
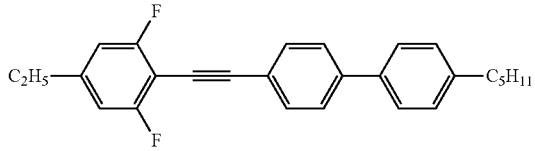

II-D-5
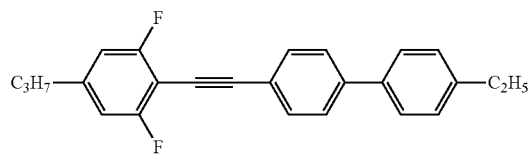

II-D-6
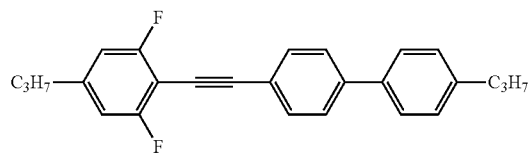

II-D-7
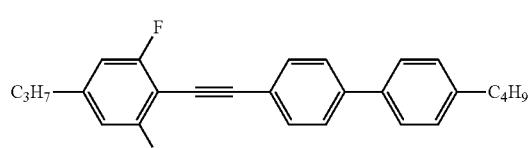

II-D-8
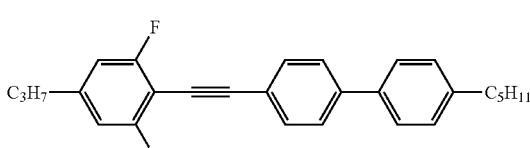

II-D-9
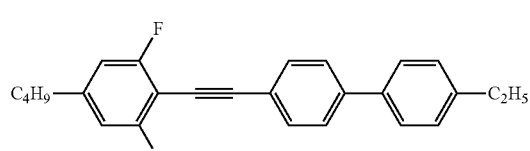

II-D-10
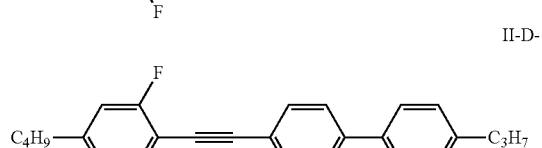

II-D-11
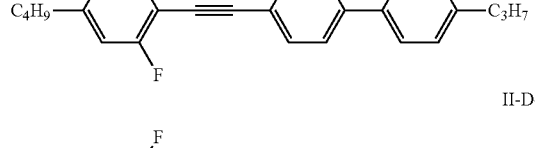

II-D-12
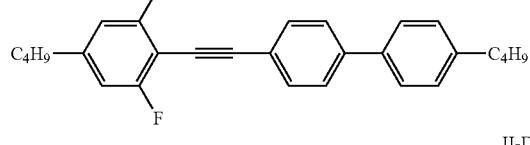

II-D-13
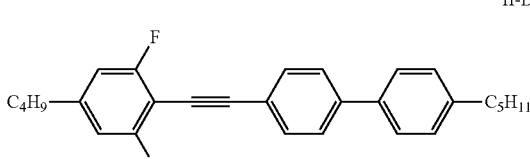

II-D-14
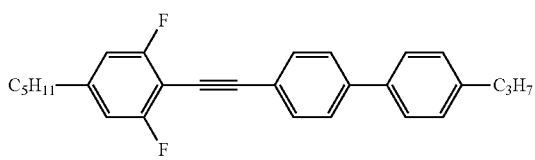

II-D-15
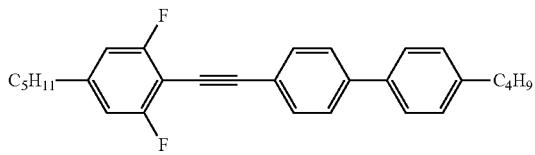

II-D-16
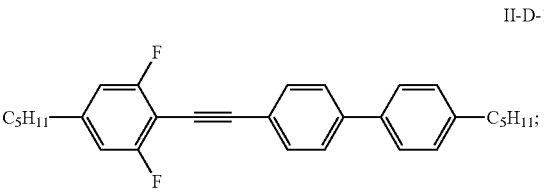

more preferably, the compound represented by general formula II is selected from one or more of formulas II-A-1, II-A-6, II-A-10, II-A-35, II-C-3 and II-C-6.

The compound represented by general formula III provided by the present invention has a bicyclic structure, and particularly, the compound represented by general formula III is selected from one or more of the following compounds:

III-A

III-B
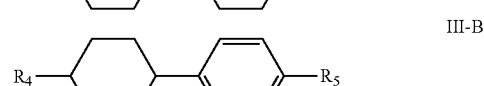

III-C
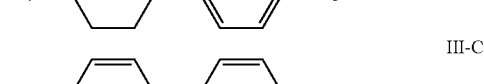

wherein $R_4$ independently represents a $C_1$-$C_7$ linear alkyl group; and $R_5$ independently represents a $C_1$-$C_7$ linear alkyl group or linear alkoxy group or a $C_2$-$C_7$ linear alkenyl group.

Preferably, the compound represented by general formula III is selected from one or more of the compounds represented by formulas III-A-1 to III-C-24:

III-A-1
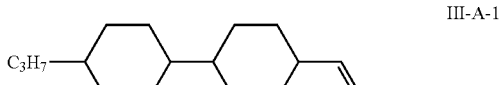

III-A-2
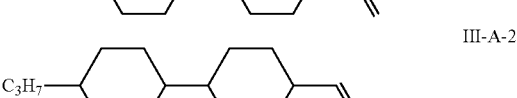

III-A-3

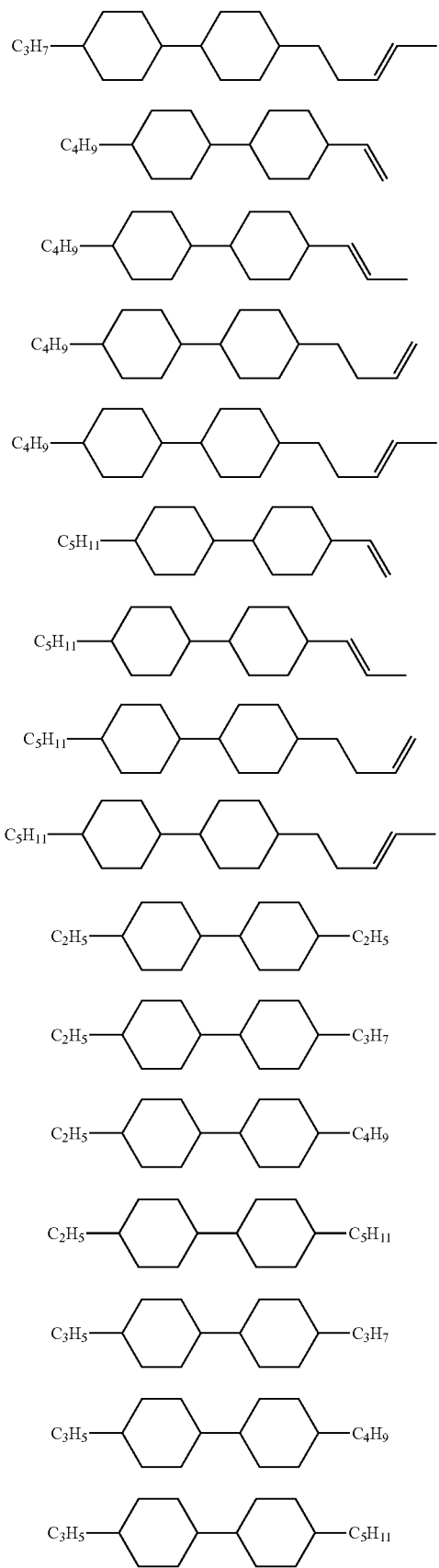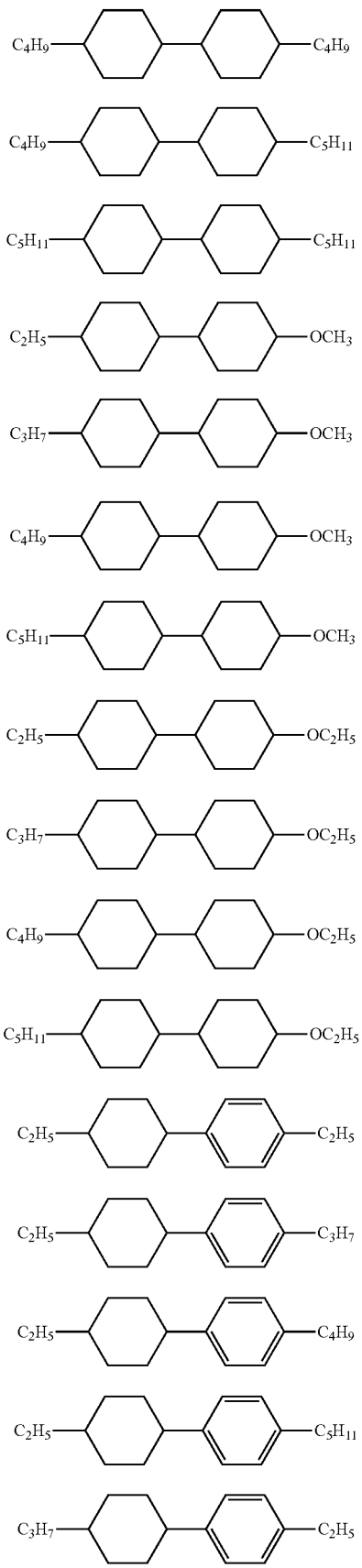

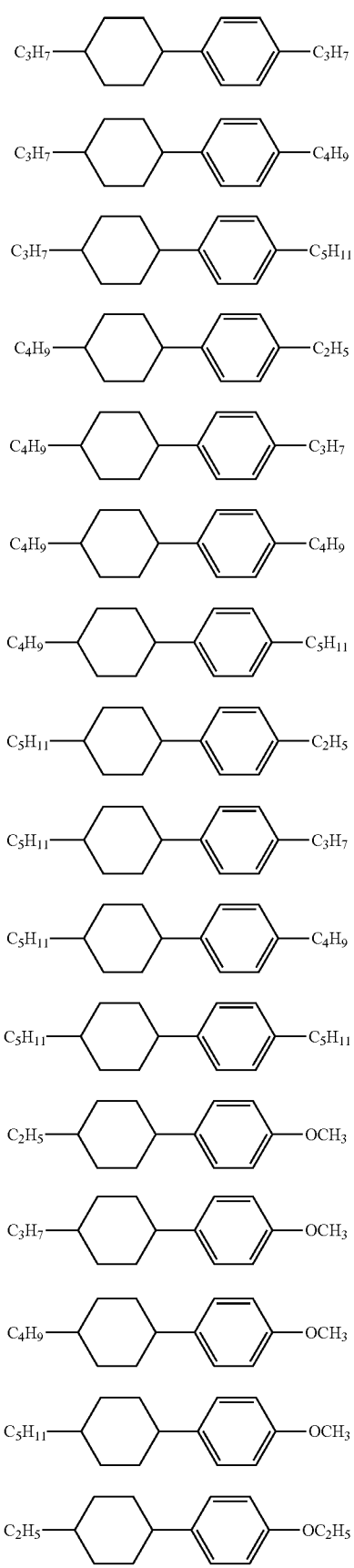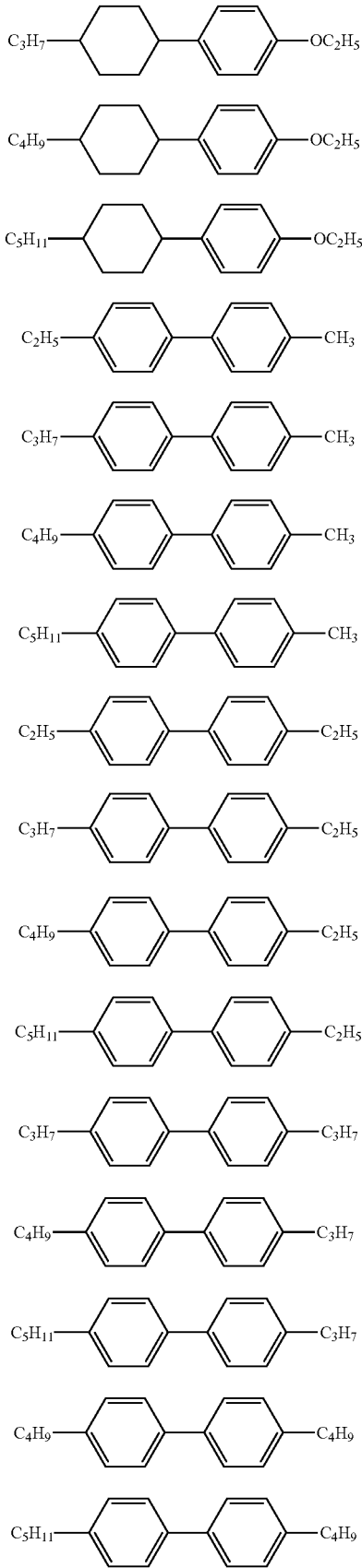

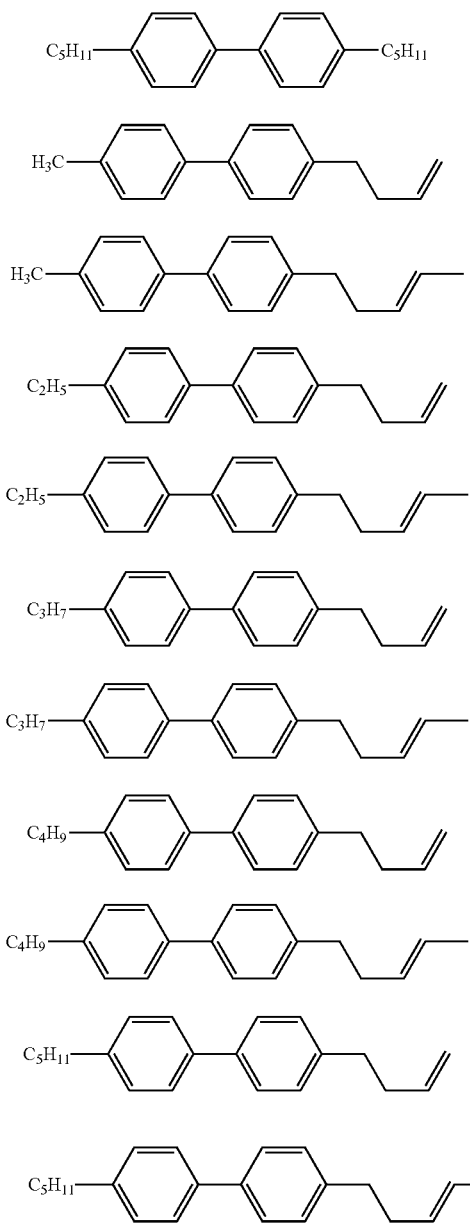

More preferably, the compound represented by general formula III is selected from one or more of formulas III-A-1, III-A-2, III-A-4, III-A-5 and III-C-4.

Particularly, the compound represented by general formula IV is selected from one or more of the following compounds of formulas IV-A to IV-C:

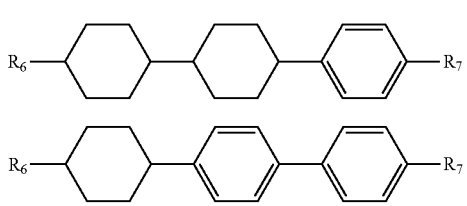

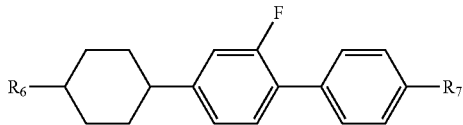

wherein $R_6$ independently represents a $C_2$-$C_{10}$ linear alkyl group or linear alkenyl group; and $R_7$ independently represents a $C_1$-$C_8$ linear alkyl group.

Preferably, the compound represented by general formula IV is selected from one or more of the structures of formulas IV-A-1 to IV-C-30:

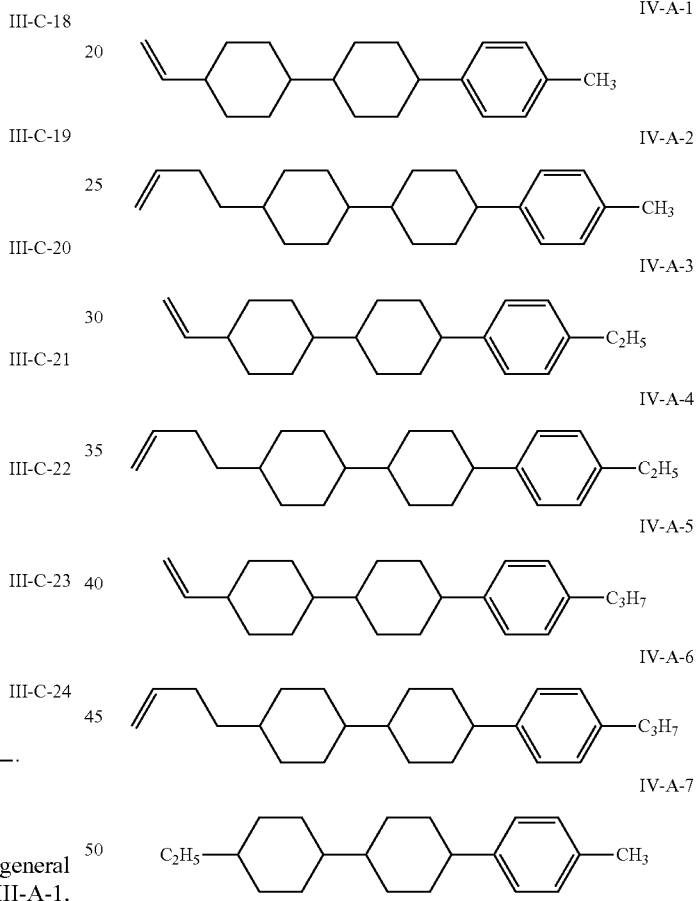

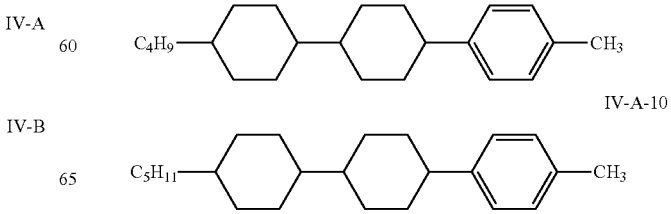

IV-A-11
IV-A-12
IV-A-13
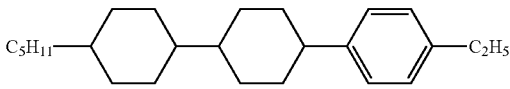
IV-A-14
IV-A-15
IV-A-16
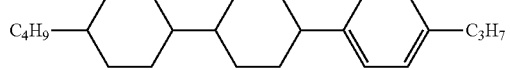
IV-A-17
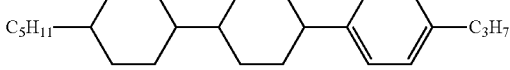
IV-A-18
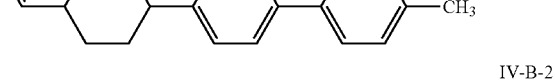
IV-B-1
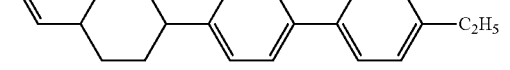
IV-B-2
IV-B-3
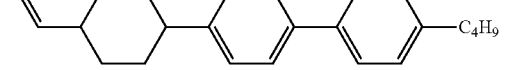
IV-B-4
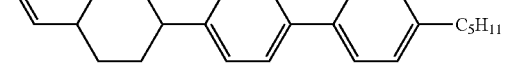
IV-B-5
IV-B-6
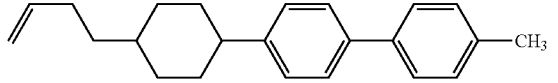
IV-B-7
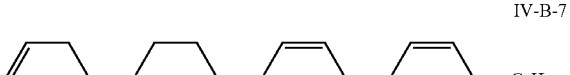
IV-B-8
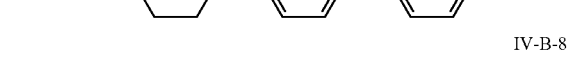
IV-B-9
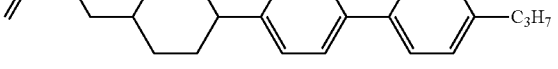
IV-B-10
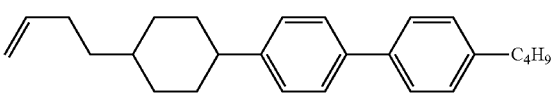
IV-B-11
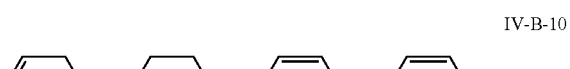
IV-B-12
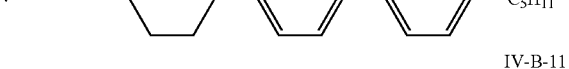
IV-B-13
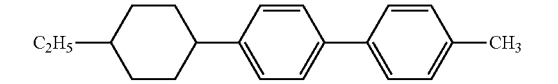
IV-B-14
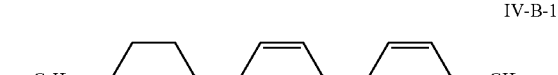
IV-B-15
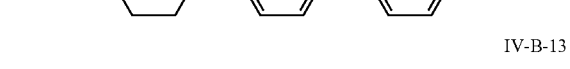
IV-B-16
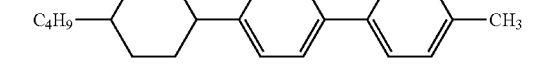
IV-B-17
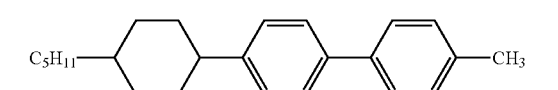
IV-B-18
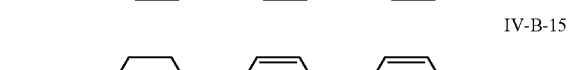

IV-B-19
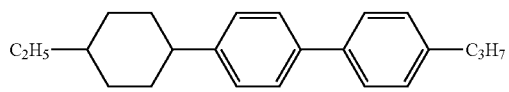
IV-B-20
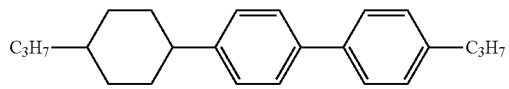
IV-B-21
IV-B-22
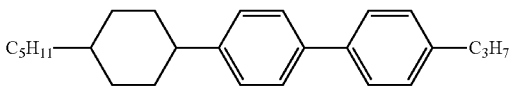
IV-C-1
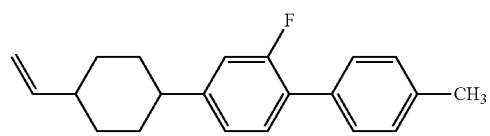
IV-C-2
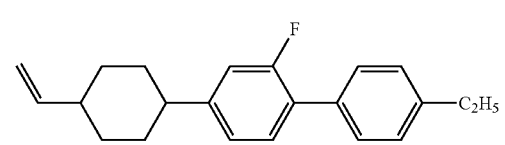
IV-C-3
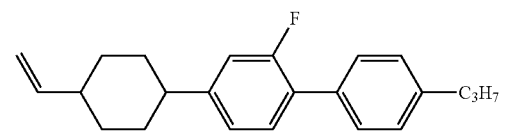
IV-C-4
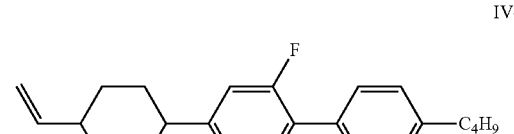
IV-C-5
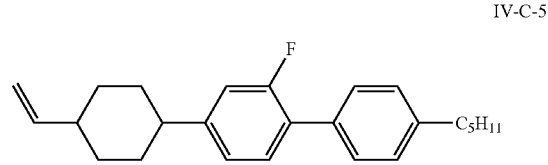
IV-C-6
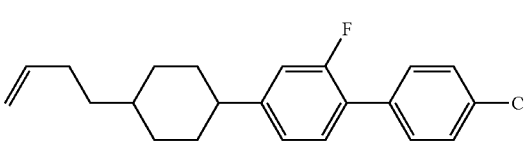
IV-C-7
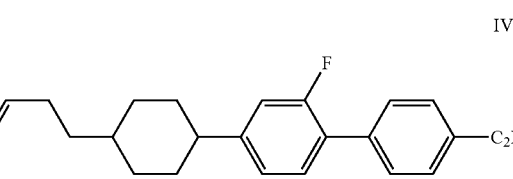
IV-C-8
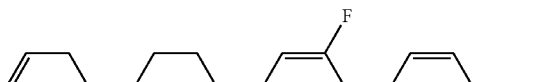
IV-C-9
IV-C-10
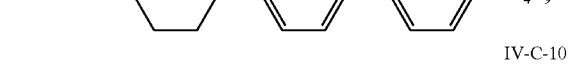
IV-C-11
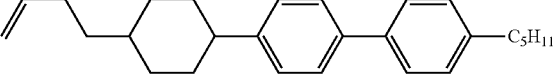
IV-C-12
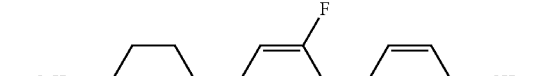
IV-C-13
IV-C-14
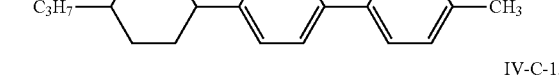
IV-C-15
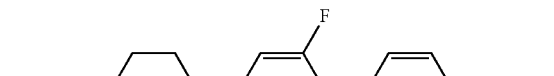
IV-C-16
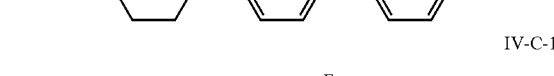
IV-C-17
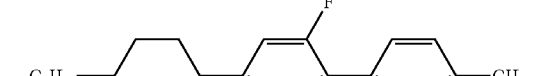

-continued
IV-C-18
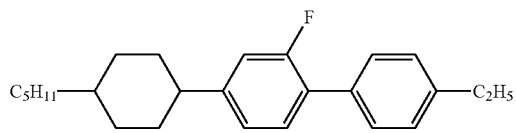
IV-C-19
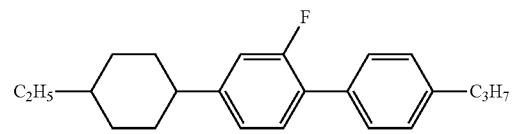
IV-C-20
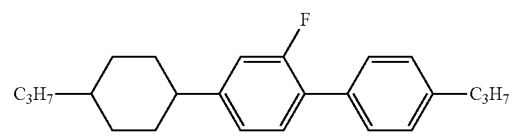
IV-C-21
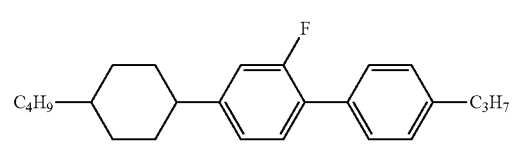
IV-C-22
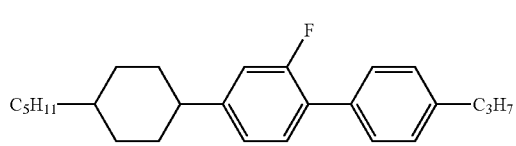
IV-C-23
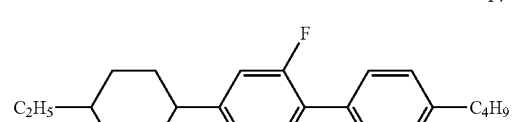
IV-C-24
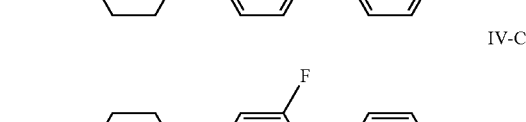
IV-C-25
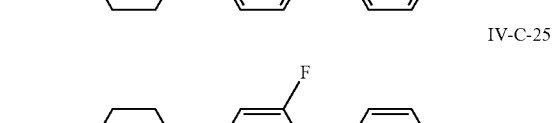
IV-C-26
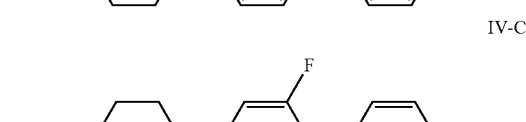
IV-C-27
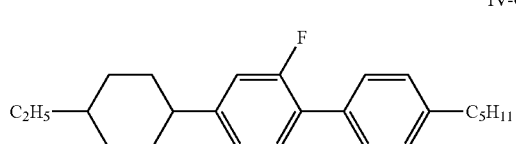
-continued
IV-C-28
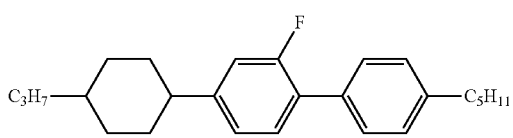
IV-C-29
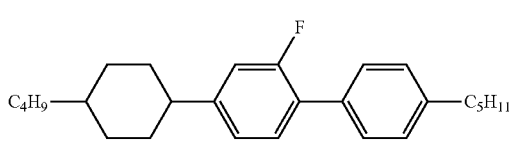
IV-C-30
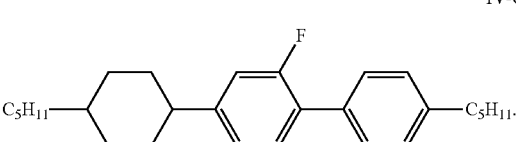
More preferably, the compound represented by general formula IV is selected from one or more of formulas IV-A-1, IV-A-2, IV-A-5, IV-A-8, IV-A-12, IV-B-1 and IV-B-3.
Preferably, the compounds of general formulas V to IX are selected from one or more of formulas V-A to IX-N:
V-A
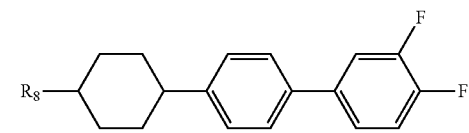
V-B
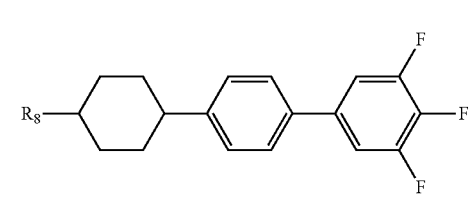
V-C
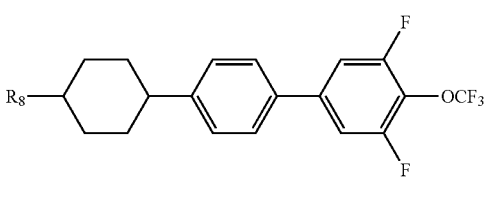
V-D
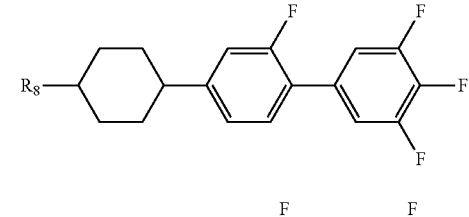
V-E
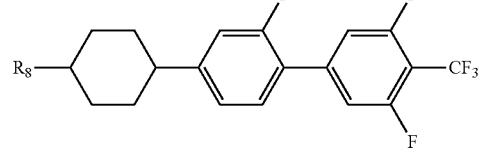

V-F
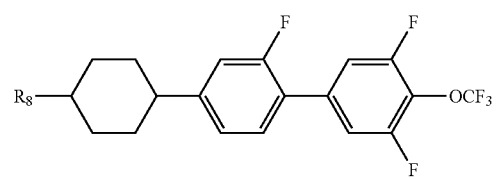
VI-A
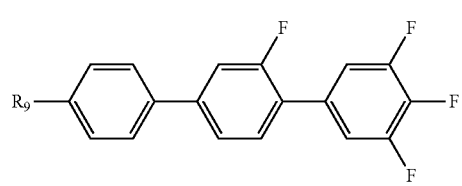
VI-B
VI-C
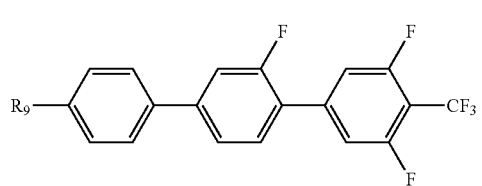
VII-A
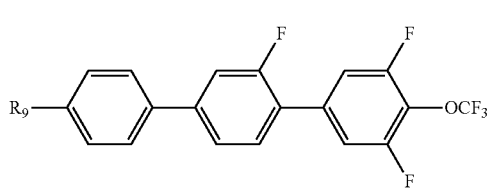
VII-B
VII-C
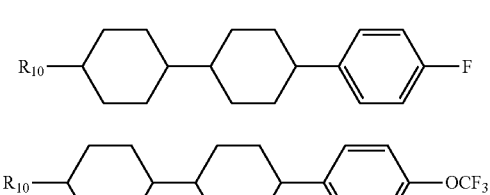
VII-D
VII-E
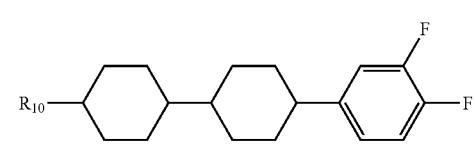
VII-F
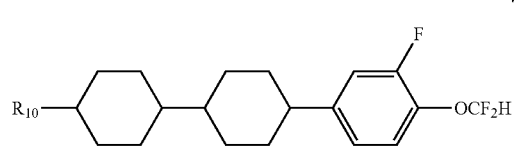
VII-G
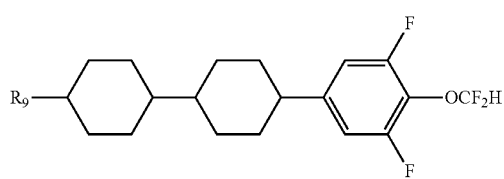
VII-H
VII-I
VIII-A
VIII-B
IX-A
IX-B
IX-C
IX-D IX-E
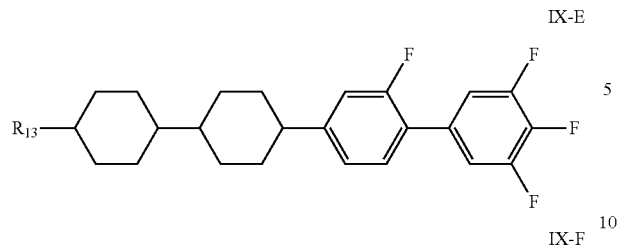
IX-F IX-G
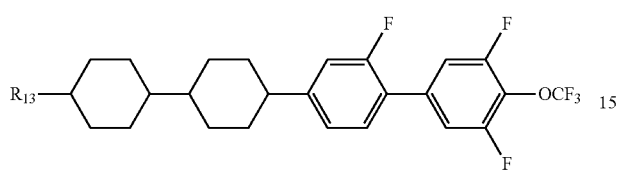
IX-H IX-I
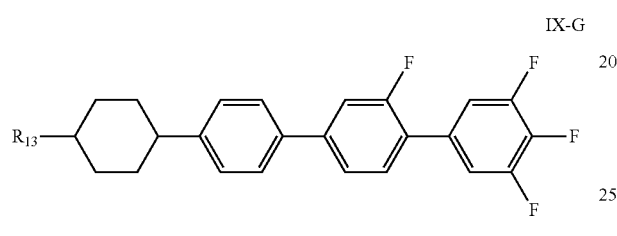
IX-J IX-K
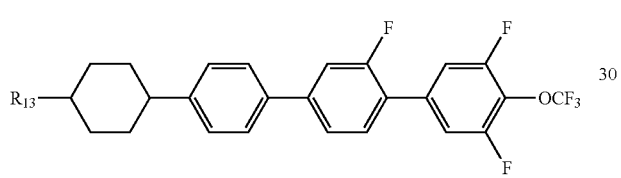
IX-L IX-M
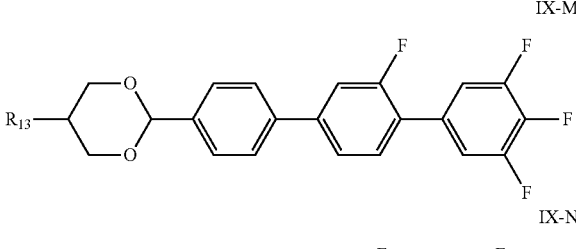
IX-N
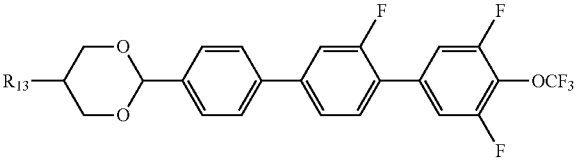

wherein $R_{10}$ independently represents a $C_2$-$C_7$ linear alkyl group or linear alkenyl group; and $R_8$, $R_9$ and $R_{11}$-$R_{13}$ each independently represent a $C_2$-$C_7$ linear alkyl group.

The technical features of the invention lie in: since compounds of type I have a strong dielectric anisotropy, compounds of type II have a large optical anisotropy, and compounds of type IV have a high clearing point and a large K-value characteristic, the use of these three types of compounds can adjust the physical parameter properties of the liquid crystal composition; moreover, the compounds of type III have a significant effect in reducing the viscosity of the system and increasing the response speed, and are a class of compounds that are essential for formulating fast-response liquid crystal mixtures. The combined use of the above-mentioned compounds can effectively reduce the rotational viscosity of the mixed liquid crystal, improves related properties of the mixed liquid crystal, and thus reduces the response time thereof.

The method for preparing the liquid crystal composition of the present invention is not particularly limited, and the liquid crystal composition of the present invention may be produced by mixing two or more compounds using a conventional method, or may be prepared according to a conventional method.

The liquid crystal composition provided by the present invention simultaneously contains a 2-methyl-3,4,5-trifluorophenyl compound, an acetylenic compound and a non-polar bicyclic compound, has a low viscosity, high resistivity, suitable optical anisotropy, large elastic constant and excellent light stability and thermal stability, and can reduce the response time of the liquid crystal display, thereby solving the problem of a slow response speed of the liquid crystal display. In addition, the liquid crystal composition can effectively improve the contrast characteristics of IPS and FFS liquid crystal displays. Therefore, the liquid crystal composition provided by the present invention is suitable for fast-response TN, IPS and FFS-type TFT liquid crystal display devices, and is particularly suitable for IPS and FFS liquid crystal display devices.

SPECIFIC EMBODIMENTS

The following examples are intended to illustrate the invention, but not to limit the scope of the invention.

Unless otherwise indicated, the percentage in the present invention is weight percentage; the temperature unit is degrees Celsius; Δn represents optical anisotropy (at 25° C.); Δε represents dielectric anisotropy (at 25° C., 1000 Hz); $V_{10}$ represents voltage threshold, and is the characteristic voltage (V, at 25° C.) when the relative transmittance is changed by 10%; γ1 represents rotational viscosity (mPa·S, at 25° C.); Cp represents the clearing point (° C.) of the liquid crystal composition; and $K_{11}$, $K_{22}$ and $K_{33}$ represent splay, twist and bend elastic constants (pN, at 25° C.), respectively.

In each of the following examples, the group structures in the liquid crystal compound are represented by the codes shown in Table 1.

TABLE 1

Group structure codes of the liquid crystal compound

| Groups | Codes | Group names |
|---|---|---|
| (cyclohexane) | C | 1,4-cyclohexylene |
| (benzene) | P | 1,4-phenylene |
| (F-benzene) | G | 2-fluoro-1,4-phenylene |
| (F,F-benzene) | U | 2,6-difluoro-1,4-phenylene |
| —O— | O | Oxygen substituent |
| —F | F | Fluorine substituent |
| —CF₃ | CF₃ | Trifluoromethyl |
| $C_nH_{2n+1}$ or $C_mH_{2m+1}$ | n or m | Alkyl group |
| —CF₂O— | Q | Difluoromethoxy bridge bond |
| —OCHF₂ | OCHF₂ | Difluoromethoxy |
| (tetrahydropyran) | A | 2,5-tetrahydropyran |
| (dioxane) | D | 2,6-dioxo-1,4-dioxane |
| (methyl-difluoro-benzene) | K | 2-methyl-3,5-difluoro-1,4-phenylene |
| —OCF₂—CF═CF₂ | X | Pentafluoropropenyl ether |
| —C≡C— | T | Acetylenic bond |
| —HC═CH— | V | Alkenyl |

Taking the following compound structures as an example:

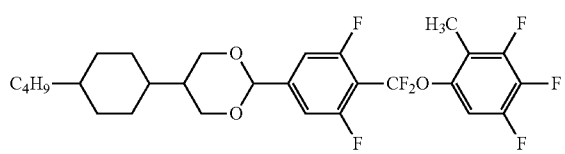

is represented as 4CDUQKF, and

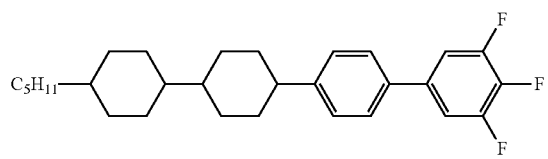

is represented as 5CCPUF

In each of the following examples, the liquid crystal compositions are all prepared by a thermal dissolution method, comprising the following steps of: weighing liquid crystal compounds in percentage by weight using a balance, wherein the order of weighing and addition is not particularly specified, and usually, the weighing and mixing are carried out successively in order of the melting points of the liquid crystal compounds from high to low; heating and stirring same at 60-100° C. so that each component is melted uniformly; then subjecting same to filtration and rotary evaporation; and finally performing encapsulation to obtain a target sample.

In each of the following examples, the weight percentage of each component in the liquid crystal composition and the performance parameters of the liquid crystal composition are shown in the following tables.

EXAMPLE 1

TABLE 2

Percentages by weight of each component and performance parameters of the liquid crystal composition

| Types | Compound codes | Percentages by weight | Performance parameters | Parameter values |
|---|---|---|---|---|
| I | 3PGUQKF | 3 | Δn | 0.098 |
| I | 3PUQKF | 5 | Δε | +2.6 |
| I | 2APUQKF | 3 | Cp | 80 |
| II | 3CPTP2 | 5 | γ1 | 50 |
| III | 3CCV | 43 | $K_{11}$ | 13.9 |
| III | 3CCV1 | 12 | $K_{22}$ | 7.0 |
| III | 5PP1 | 5 | $K_{33}$ | 16.1 |
| IV | VCCP1 | 10 | | |
| IV | V2CCP1 | 7 | | |
| IV | VCPP3 | 7 | | |

EXAMPLE 2

TABLE 3

Percentages by weight of each component and performance parameters of the liquid crystal composition

| Types | Compound codes | Percentages by weight | Performance parameters | Parameter values |
|---|---|---|---|---|
| I | 3PGUQKF | 5 | $\Delta n$ | 0.098 |
| I | 3DUQKF | 5 | $\Delta \varepsilon$ | +2.8 |
| II | 3CPTP2 | 11 | Cp | 75 |
| III | 3CCV | 44 | $\gamma 1$ | 48 |
| III | 3CCV1 | 13 | $K_{11}$ | 12.8 |
| III | 5PP1 | 10 | $K_{22}$ | 6.4 |
| IV | VCCP1 | 12 | $K_{33}$ | 14.8 |

EXAMPLE 3

TABLE 4

Percentages by weight of each component and performance parameters of the liquid crystal composition

| Types | Compound codes | Percentages by weight | Performance parameters | Parameter values |
|---|---|---|---|---|
| I | 3PGUQKF | 5 | $\Delta n$ | 0.099 |
| I | 2APUQKF | 4.5 | $\Delta \varepsilon$ | +2.6 |
| II | 3CPTP2 | 7 | Cp | 81 |
| III | 3CCV | 43 | $\gamma 1$ | 52 |
| III | 3CCV1 | 12 | $K_{11}$ | 13.8 |
| III | 5PP1 | 9 | $K_{22}$ | 6.9 |
| IV | VCCP1 | 10 | $K_{33}$ | 15.9 |
| IV | V2CCP1 | 4.5 | | |
| IV | VCPP3 | 5 | | |

EXAMPLE 4

TABLE 5

Percentages by weight of each component and performance parameters of the liquid crystal composition

| Types | Compound codes | Percentages by weight | Performance parameters | Parameter values |
|---|---|---|---|---|
| I | 3PGUQKF | 4 | $\Delta n$ | 0.101 |
| I | 3PUQKF | 10 | $\Delta \varepsilon$ | +5.8 |
| I | 2APUQKF | 5 | Cp | 90 |
| II | 3CPTP2 | 5 | $\gamma 1$ | 63 |
| III | 3CCV | 40 | $K_{11}$ | 13.9 |
| III | 3CCV1 | 5 | $K_{22}$ | 7.0 |
| IV | 3CCP1 | 5 | $K_{33}$ | 16.7 |
| IV | 3CPP2 | 6 | | |
| IV | VCCP1 | 5 | | |
| VII | 3CCPOCF3 | 6 | | |
| VII | 5CCPOCF3 | 4 | | |
| VII | 2CCGF | 5 | | |

EXAMPLE 5

TABLE 6

Percentages by weight of each component and performance parameters of the liquid crystal composition

| Types | Compound codes | Percentages by weight | Performance parameters | Parameter values |
|---|---|---|---|---|
| I | 3PGUQKF | 5 | $\Delta n$ | 0.114 |
| I | 3PUQKF | 9 | $\Delta \varepsilon$ | +5.2 |
| II | 3CPTP2 | 9 | Cp | 75 |
| III | 3CCV | 38 | $\gamma 1$ | 48 |
| III | 3CCV1 | 5 | $K_{11}$ | 12.8 |
| III | 5PP1 | 7 | $K_{22}$ | 6.6 |
| IV | VCPP3 | 4 | $K_{33}$ | 13.5 |
| V | 2CPGF | 7 | | |
| V | 3CPGF | 6 | | |
| VII | 2CCGF | 4 | | |
| VII | 3CCPOCF$_3$ | 6 | | |

EXAMPLE 6

TABLE 7

Percentages by weight of each component and performance parameters of the liquid crystal composition

| Types | Compound codes | Percentages by weight | Performance parameters | Parameter values |
|---|---|---|---|---|
| I | 3PUQKF | 12 | $\Delta n$ | 0.105 |
| I | 5PUQKF | 12 | $\Delta \varepsilon$ | +7.8 |
| I | 4DUQKF | 3 | Cp | 90 |
| II | 3CPTP2 | 4 | $\gamma 1$ | 75 |
| III | 3CCV | 35 | $K_{11}$ | 12.4 |
| III | 3CCV1 | 5 | $K_{22}$ | 6.2 |
| IV | VCCP1 | 14 | $K_{33}$ | 17.0 |
| V | 3CPGF | 8 | | |
| VIII | 3CGPC3 | 4 | | |
| IX | 3CCPUF | 3 | | |

EXAMPLE 7

TABLE 8

Percentages by weight of each component and performance parameters of the liquid crystal composition

| Types | Compound codes | Percentages by weight | Performance parameters | Parameter values |
|---|---|---|---|---|
| I | 3PUQKF | 10 | $\Delta n$ | 0.104 |
| I | 5PUQKF | 10 | $\Delta \varepsilon$ | +7.5 |
| I | 3PGUQKF | 3 | Cp | 91 |
| I | 3DUQKF | 3 | $\gamma 1$ | 74 |
| I | 3DPUQKF | 3 | $K_{11}$ | 13.8 |
| II | 3CPTP2 | 4 | $K_{22}$ | 6.9 |
| III | 3CCV | 30 | $K_{33}$ | 17.0 |
| III | 3CCV1 | 5 | | |
| III | 3CC2V1 | 5 | | |
| IV | VCCP1 | 12 | | |
| IV | V2CCP1 | 6 | | |
| V | 3CPGF | 9 | | |

EXAMPLE 8

TABLE 9

Percentages by weight of each component and performance parameters of the liquid crystal composition

| Types | Compound codes | Percentages by weight | Performance parameters | Parameter values |
|---|---|---|---|---|
| I | 3PUQKF | 10 | $\Delta n$ | 0.105 |
| I | 5PUQKF | 5 | $\Delta\varepsilon$ | +11.5 |
| I | 3PGUQKF | 2 | Cp | 94 |
| I | 3DUQKF | 4 | $\gamma 1$ | 82 |
| I | 4DUQKF | 5 | $K_{11}$ | 13.1 |
| I | 4DPUQKF | 4 | $K_{22}$ | 6.6 |
| II | 4CPTP1 | 3 | $K_{33}$ | 16.9 |
| III | 3CCV | 33 | | |
| III | 3CCV1 | 3 | | |
| IV | VCCP1 | 6 | | |
| V | 3CPGF | 9 | | |
| VII | 3CCGF | 7 | | |
| IX | 2CCPUF | 3 | | |
| IX | 3CCPUF | 3 | | |
| IX | 5CCPUF | 3 | | |

EXAMPLE 9

TABLE 10

Percentages by weight of each component and performance parameters of the liquid crystal composition

| Types | Compound codes | Percentages by weight | Performance parameters | Parameter values |
|---|---|---|---|---|
| I | 3PUQKF | 12 | $\Delta n$ | 0.100 |
| I | 3PGUQKF | 3 | $\Delta\varepsilon$ | +5.8 |
| I | 2APUQKF | 4 | Cp | 91 |
| I | 3DPUQKF | 3 | $\gamma 1$ | 65 |
| II | 3CPTP2 | 4 | $K_{11}$ | 13.9 |
| III | 3CCV | 30 | $K_{22}$ | 7.0 |
| III | 3CCV1 | 5 | $K_{33}$ | 16.8 |
| III | 3CC2V1 | 5 | | |
| III | 5PP1 | 7 | | |
| IV | VCCP1 | 12 | | |
| IV | V2CCP1 | 6 | | |
| VII | 3CCGF | 9 | | |

EXAMPLE 10

TABLE 11

Percentages by weight of each component and performance parameters of the liquid crystal composition

| Types | Compound codes | Percentages by weight | Performance parameters | Parameter values |
|---|---|---|---|---|
| I | 3PGUQKF | 5 | $\Delta n$ | 0.122 |
| I | 3PUQKF | 4 | $\Delta\varepsilon$ | +2.4 |
| II | 3CPTP2 | 10 | Cp | 80 |
| II | 3PTP1 | 6 | $\gamma 1$ | 49 |
| II | 4PTP1 | 5 | $K_{11}$ | 13.5 |
| II | 2PTP1 | 5 | $K_{22}$ | 6.8 |
| III | 3CCV | 44 | $K_{33}$ | 16.2 |
| III | 3CCV1 | 9 | | |
| III | 1V2PP1 | 7 | | |
| IV | VCCP1 | 5 | | |

EXAMPLE 11

TABLE 12

Percentages by weight of each component and performance parameters of the liquid crystal composition

| Types | Compound codes | Percentages by weight | Performance parameters | Parameter values |
|---|---|---|---|---|
| I | 3PGUQKF | 5 | $\Delta n$ | 0.100 |
| I | 5PGUQKF | 3 | $\Delta\varepsilon$ | +3.4 |
| I | 4DPUQKF | 2 | Cp | 75 |
| I | 3APUQKF | 2 | $\gamma 1$ | 49 |
| II | 3CPTP2 | 9 | $K_{11}$ | 12.8 |
| II | V2PTP2V | 5 | $K_{22}$ | 6.4 |
| III | 3CCV | 44 | $K_{33}$ | 14.6 |
| III | 4CCV | 5 | | |
| III | 3CCV1 | 12 | | |
| III | 5PP1 | 5 | | |
| IV | VCCP1 | 8 | | |

Comparative Example 1

TABLE 13

Percentages by weight of each component and performance parameters of the liquid crystal composition

| Compound codes | Percentages by weight | Performance parameters | Parameter values |
|---|---|---|---|
| 3PGUQUF | 7 | $\Delta n$ | 0.098 |
| 3APUQUF | 5 | $\Delta\varepsilon$ | +2.6 |
| 2PGP3 | 6 | Cp | 81 |
| 3CCV | 42 | $\gamma 1$ | 52 |
| 3CCV1 | 12 | $K_{11}$ | 13.8 |
| 1V2PP1 | 7 | $K_{22}$ | 6.9 |
| VCCP1 | 11 | $K_{33}$ | 16.0 |
| V2CCP1 | 10 | | |

The values of the performance parameters of the liquid crystal compositions obtained in example 1 and comparative example 1 are summarized and compared, and reference can be made to table 14.

TABLE 14

Comparison of performance parameters of liquid crystal compositions

| | $\Delta n$ | $\Delta\varepsilon$ | Cp | $\gamma 1$ | $K_{11}$ | $K_{22}$ | $K_{33}$ |
|---|---|---|---|---|---|---|---|
| Example 1 | 0.098 | +2.6 | 80 | 50 | 13.9 | 7.0 | 16.1 |
| Comparative example 1 | 0.098 | +2.6 | 81 | 52 | 13.8 | 6.9 | 16.0 |

Upon comparison, it can be seen that, as compared with comparative example 1, the liquid crystal composition provided in example 1 has a low rotational viscosity and a large elastic constant, and therefore has a shorter response time and a faster response speed.

Comparative Example 2

TABLE 15

Percentages by weight of each component and performance parameters of the liquid crystal composition

| Compound codes | Percentages by weight | Performance parameters | Parameter values |
|---|---|---|---|
| 3PUQUF | 7 | $\Delta n$ | 0.100 |
| 3CUQUF | 7 | $\Delta \varepsilon$ | +5.8 |
| 2PGUF | 7 | Cp | 90 |
| 3CCV | 35 | $\gamma 1$ | 90 |
| 3CCV1 | 8 | $K_{11}$ | 12.8 |
| VCCP1 | 10 | $K_{22}$ | 6.5 |
| V2CCP1 | 6 | $K_{33}$ | 16.2 |
| 2PGP3 | 4 | | |
| 2CCPUF | 5 | | |
| 3CCPUF | 5 | | |
| 3CPPC3 | 4 | | |
| 3CGPC3 | 2 | | |

The values of the performance parameters of the liquid crystal compositions obtained in example 9 and comparative example 2 are summarized and compared, and reference can be made to table 16.

TABLE 16

Comparison of performance parameters of liquid crystal compositions

| | $\Delta n$ | $\Delta \varepsilon$ | Cp | $\gamma 1$ | $K_{11}$ | $K_{22}$ | $K_{33}$ |
|---|---|---|---|---|---|---|---|
| Example 9 | 0.100 | +5.8 | 91 | 65 | 13.9 | 7.0 | 16.8 |
| Comparative example 2 | 0.100 | +5.8 | 90 | 90 | 12.8 | 6.5 | 16.2 |

Upon comparison, it can be seen that, as compared with comparative example 2, the liquid crystal composition provided in example 9 has a low rotational viscosity and a large elastic constant, and therefore has a shorter response time and a faster response speed.

Although the present invention has been described in detail with general explanations and specific embodiments, it is obvious to a person skilled in the art that some modifications or improvements can be made thereto based on the present invention. Therefore, all these modifications and improvements which can be made without departing from the scope of the present invention belong to the scope claimed in the invention.

INDUSTRIAL APPLICABILITY

The liquid crystal composition provided by the present invention simultaneously contains a 2-methyl-3,4,5-trifluorophenyl compound, an acetylenic compound and a nonpolar bicyclic compound, has a low viscosity, high resistivity, suitable optical anisotropy, large elastic constant and excellent light stability and thermal stability, and can reduce the response time of the liquid crystal display, thereby solving the problem of a slow response speed of the liquid crystal display. In addition, the liquid crystal composition can effectively improve the contrast characteristics of IPS and FFS liquid crystal displays. Therefore, the liquid crystal composition provided by the present invention is suitable for fast-response TN, IPS and FFS-type TFT liquid crystal display devices, and has broad application prospects and a good industrial applicability in the liquid crystal display field.

The invention claimed is:

1. A liquid crystal composition, comprising, in percentages by weight, 5-40% of one or more compounds represented by general formula I, 2-30% of one or more compounds represented by general formula II, and 20-70% of one or more compounds represented by general formula III,

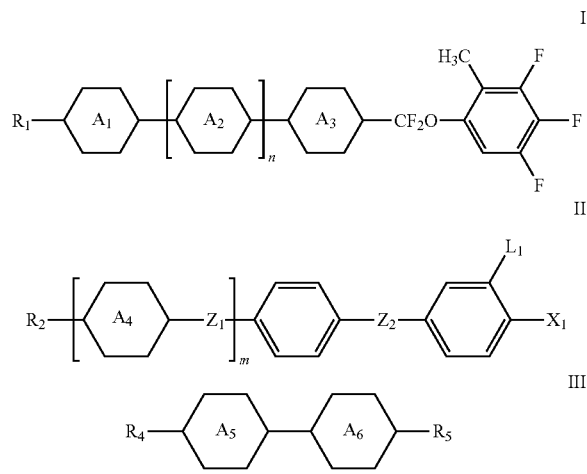

wherein $R_1$ independently represents a $C_1$-$C_{12}$ linear alkyl group or a $C_2$-$C_{12}$ linear alkenyl group; and $R_2$ independently represents a $C_1$-$C_{12}$ linear alkyl group, a $C_1$-$C_{12}$ linear alkoxy group or a $C_2$-$C_{12}$ linear alkenyl group; $R_4$ and $R_5$ each independently represent an unsubstituted $C_1$-$C_{12}$ linear alkyl group or a $C_1$-$C_{12}$ linear alkyl group having one or more non-adjacent $CH_2$ substituted with O, S or CH=CH;

$X_1$ independently represents F, Cl, CN, a $C_1$-$C_{12}$ linear alkyl group, a $C_1$-$C_{12}$ linear alkoxy group or a $C_2$-$C_{12}$ linear alkenyl group;

$Z_1$ and $Z_2$ each independently represent a single bond or an acetylenic bond, with at least one of $Z_1$ and $Z_2$ being an acetylenic bond;

$L_1$ independently represents H or F;

$A_1$, $A_2$ and $A_3$ each independently represent:

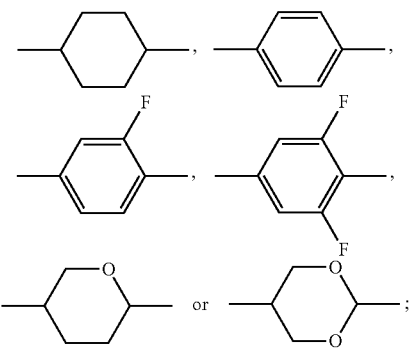

$A_4$ independently represents:

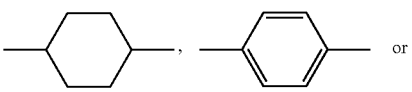

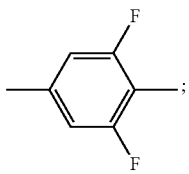

$A_5$ and $A_6$ each independently represent a trans-1,4-cyclohexylene group or a 1,4-phenylene group; and m and n each independently represent 0 or 1.

2. The liquid crystal composition according to claim 1, further comprising 4-24% by weight of a compound represented by general formula IV,

wherein $R_6$ and $R_7$ each independently represent a $C_1$-$C_{12}$ linear alkyl group or a $C_1$-$C_{12}$ linear alkyl group having one or more non-adjacent $CH_2$ substituted with O, S or CH=CH; and $A_7$ is selected from one of the following structures:

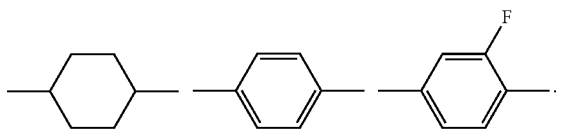

3. The liquid crystal composition according to claim 2, further comprising 9-25% by weight of compounds represented by general formulas V to IX,

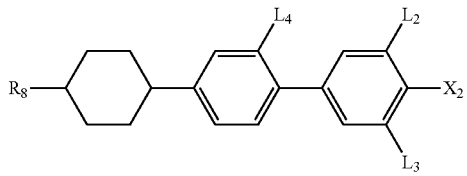

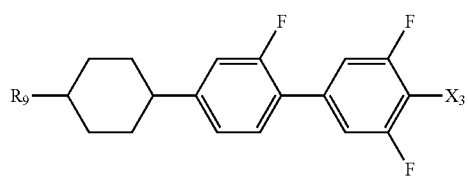

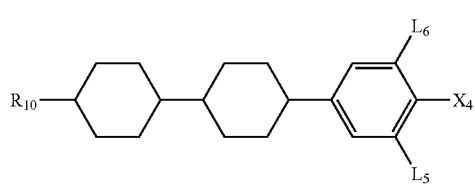

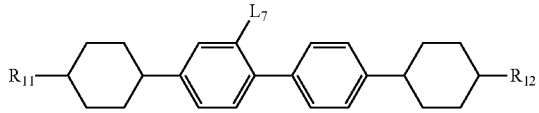

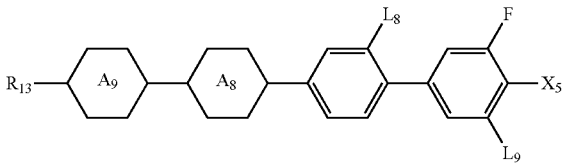

wherein $R_{10}$ independently represents a $C_1$-$C_{12}$ linear alkyl group or a $C_2$-$C_{12}$ linear alkenyl group; $R_8$, $R_9$ and $R_{11}$-$R_{13}$ each independently represent a $C_1$-$C_{12}$ linear alkyl group; $X_2$-$X_5$ each independently represent F, $CF_3$, $OCF_3$ or $OCF_2H$; $L_2$-$L_9$ each independently represent H or F; and $A_8$ and $A_9$ each independently represent:

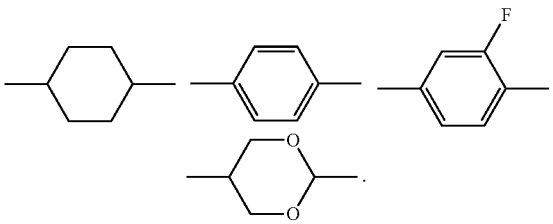

4. The liquid crystal composition according to claim 3, comprising, in percentages by weight, 9-12% of one or more compounds represented by general formula I, 5-26% of one or more compounds represented by general formula II, 60-67% of one or more compounds represented by general formula III, and 5-24% of one or more compounds represented by general formula IV.

5. The liquid crystal composition according to claim 3, comprising, in percentages by weight, 14-30% of one or more compounds represented by general formula I, 3-9% of one or more compounds represented by general formula II, 30-50% of one or more compounds represented by general formula III, 4-18% of one or more compounds represented by general formula IV, and 9-23% of one or more compounds represented by general formulas V to IX.

6. The liquid crystal composition according to claim 1, wherein the compound represented by general formula I is selected from one or more of the compounds represented by formulas I-A to I-U:

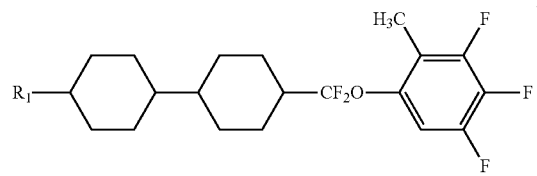

-continued
I-B
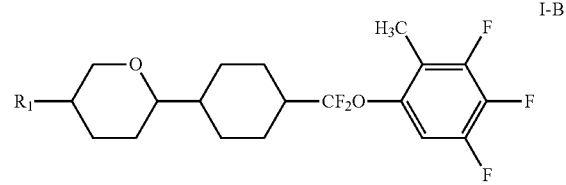
I-C
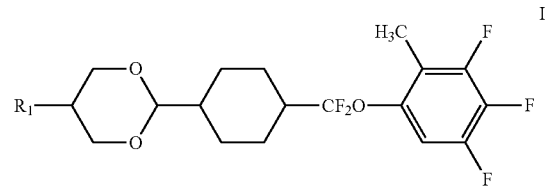
I-D
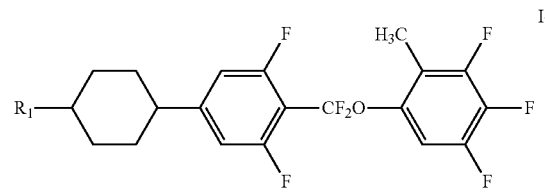
I-E
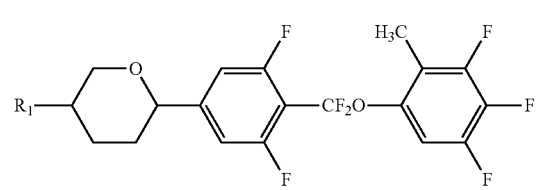
I-F
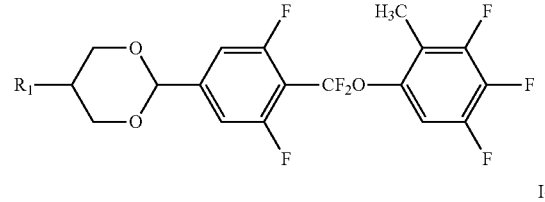
I-G
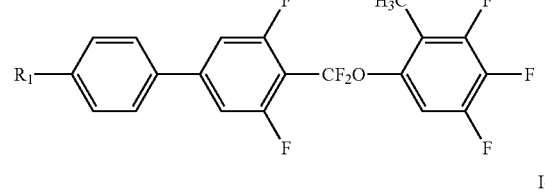
I-H
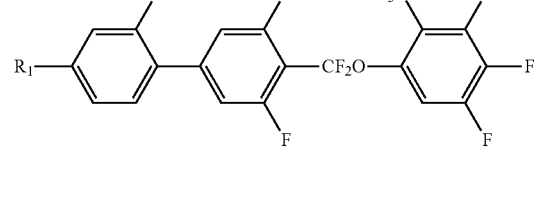
I-I
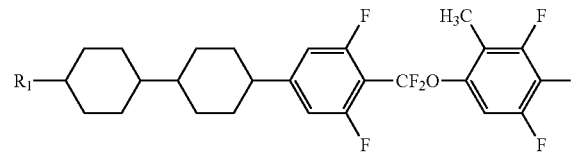
-continued
I-J
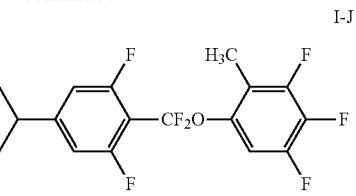
I-K
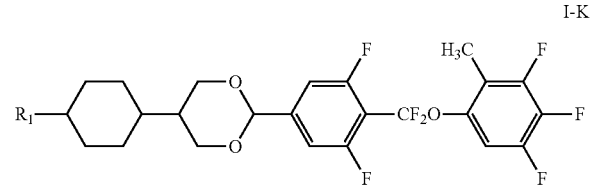
I-L
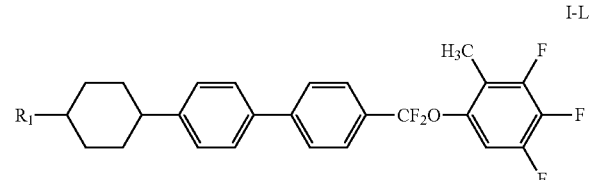
I-M
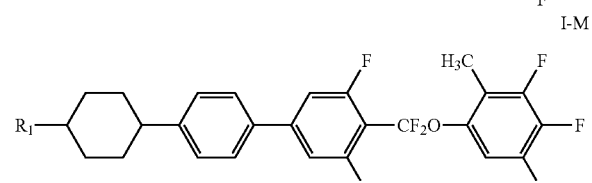
I-N
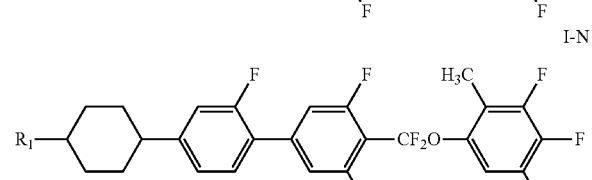
I-O
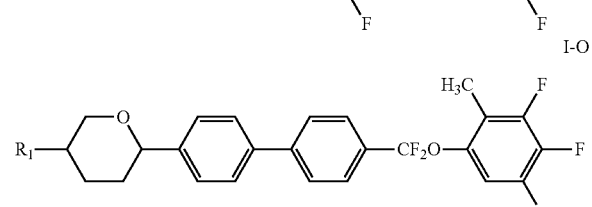
I-P
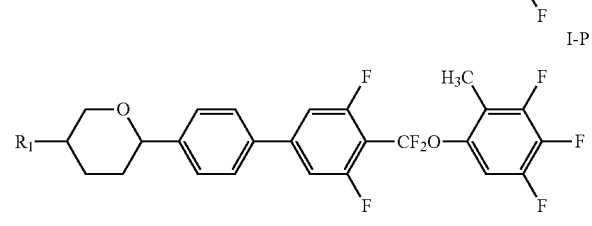
I-Q
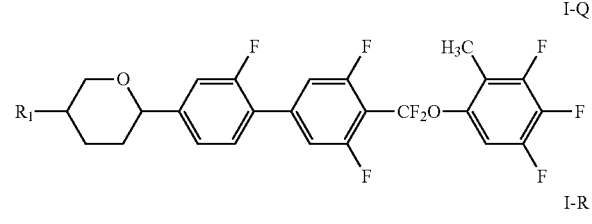
I-R
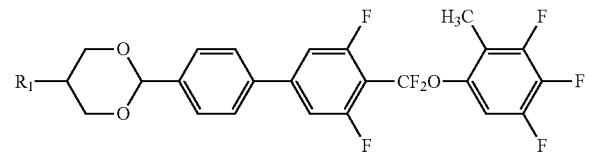

-continued

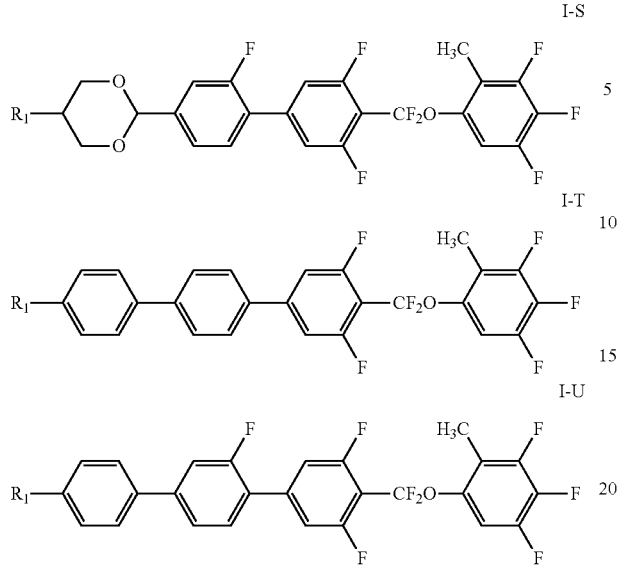

wherein $R_1$ independently represents a $C_1$-$C_7$ linear alkyl group; and
the compound represented by general formula II is selected from one or more of formulas II-A to II-D:

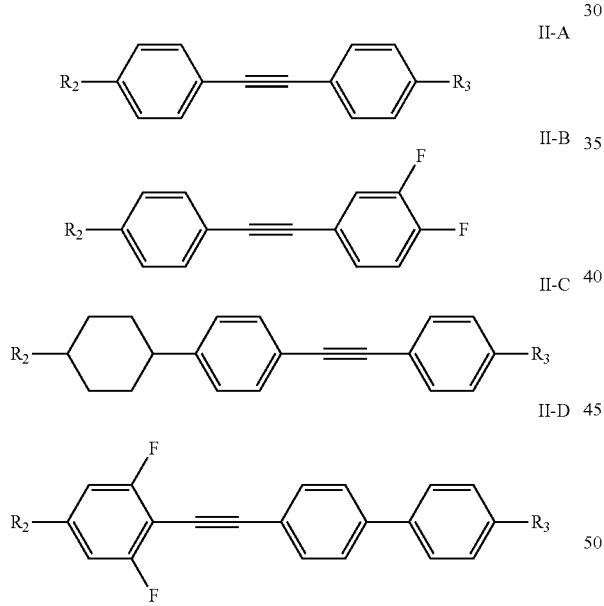

wherein $R_2$ independently represents a $C_1$-$C_7$ linear alkyl group or a $C_2$-$C_7$ linear alkenyl group; and $R_3$ independently represents a $C_1$-$C_7$ linear alkyl group, a $C_1$-$C_7$ linear alkoxy group or a $C_2$-$C_7$ linear alkenyl group;
and the compound represented by general formula III is selected from one or more of the following compounds:

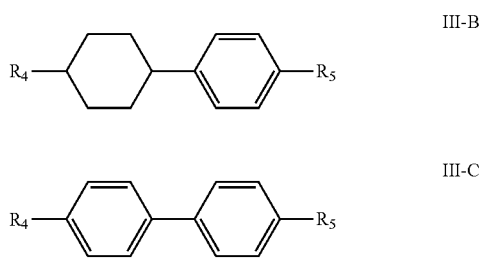

wherein $R_4$ independently represents a $C_1$-$C_7$ linear alkyl group; and $R_5$ independently represents a $C_1$-$C_7$ linear alkyl group or linear alkoxy group or a $C_2$-$C_7$ linear alkenyl group.

7. The liquid crystal composition according to claim 1, wherein the compound represented by general formula I is selected from one or more of the compounds represented by formulas I-A-1 to I-U-4:

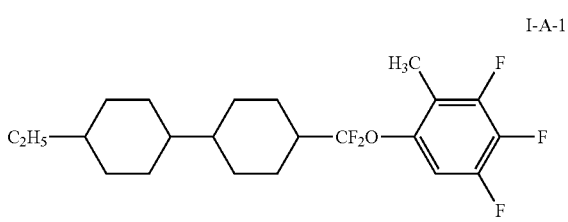

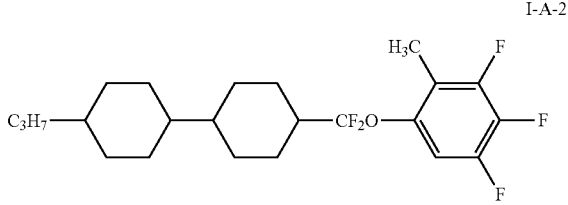

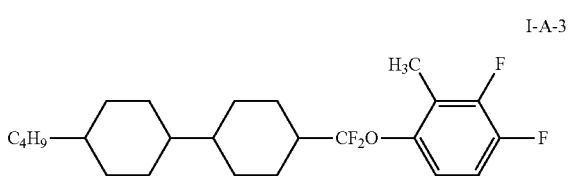

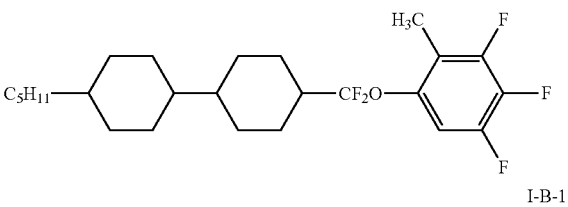

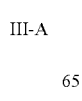

-continued
I-B-2
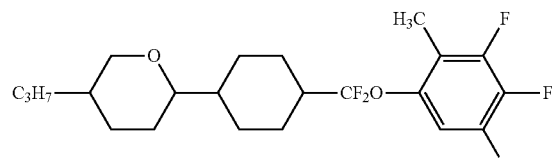
I-B-3
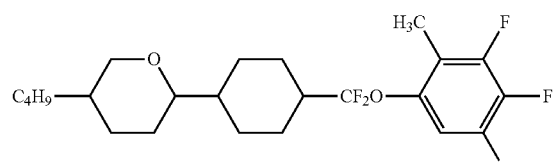
I-B-4
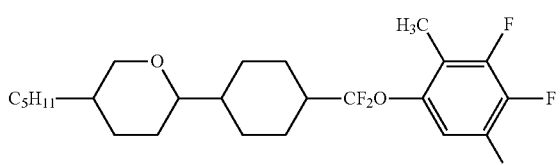
I-C-1
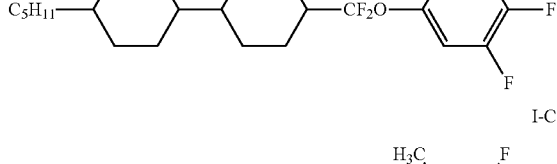
I-C-2
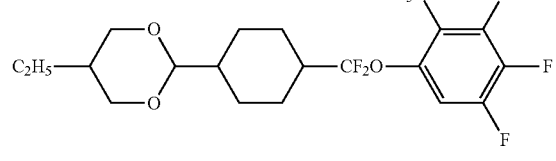
I-C-3
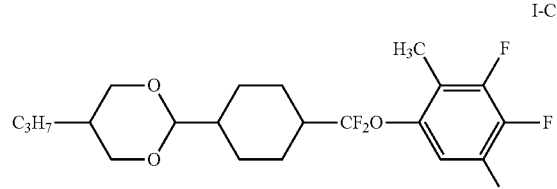
I-C-4
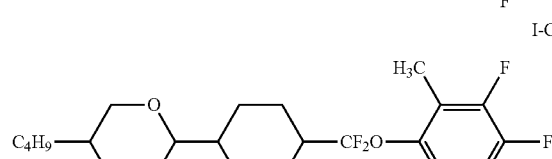
I-D-1
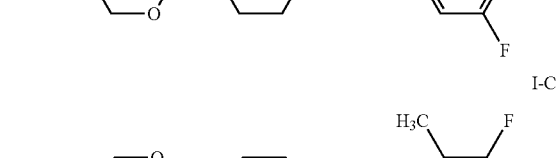
-continued
I-D-2
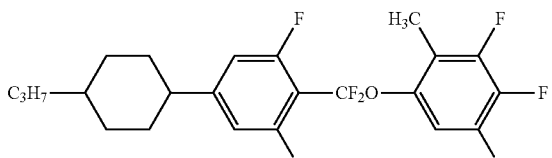
I-D-3
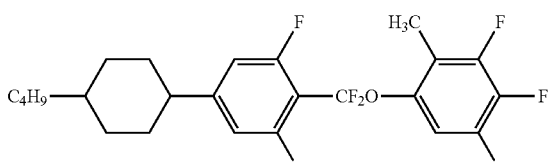
I-D-4
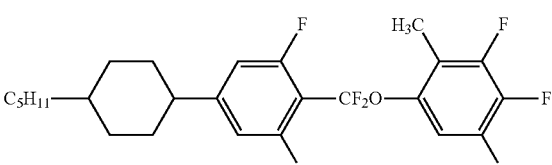
I-E-1
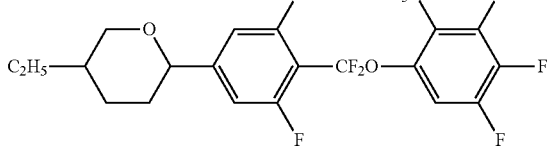
I-E-2
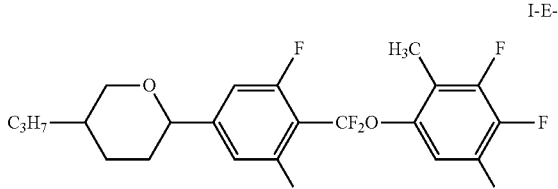
I-E-3
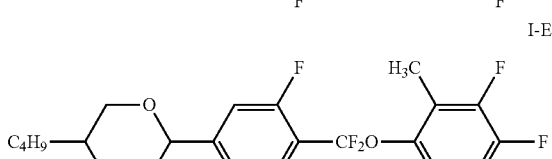
I-E-4
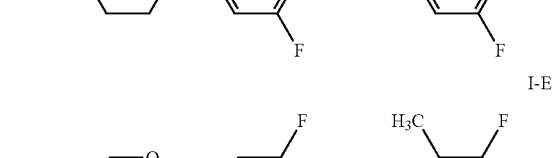
I-F-1
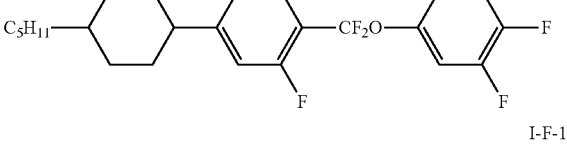

I-F-2 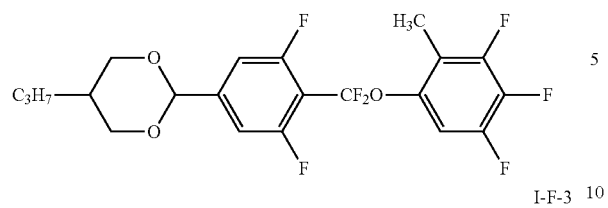
I-F-3 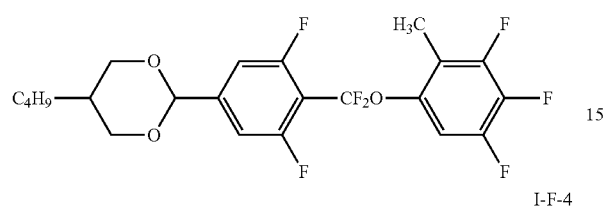
I-F-4 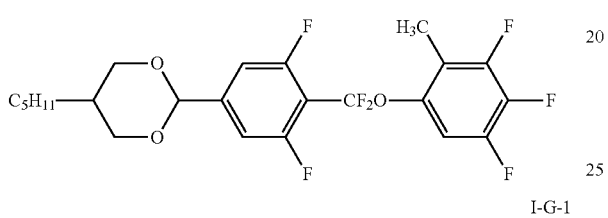
I-G-1 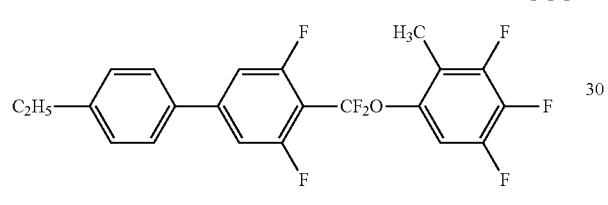
I-G-2 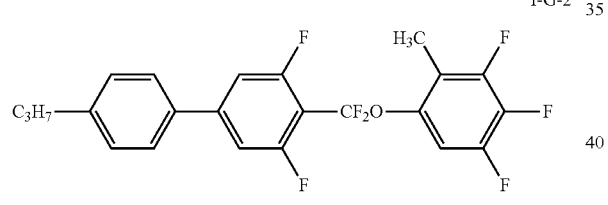
I-G-3 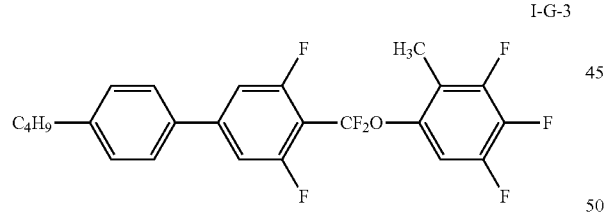
I-G-4 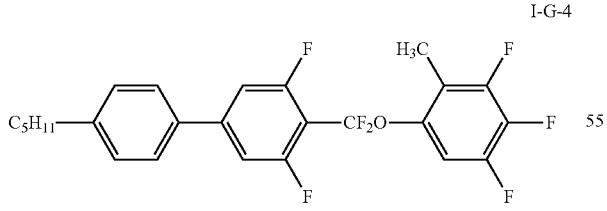
I-H-1 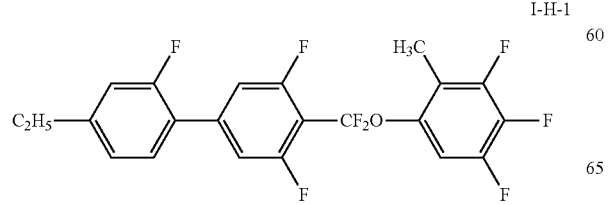
I-H-2 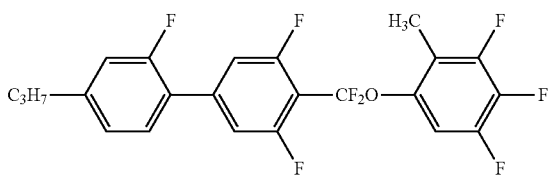
I-H-3 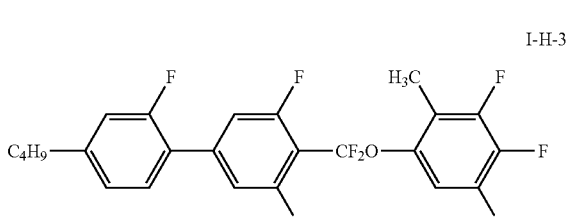
I-H-4 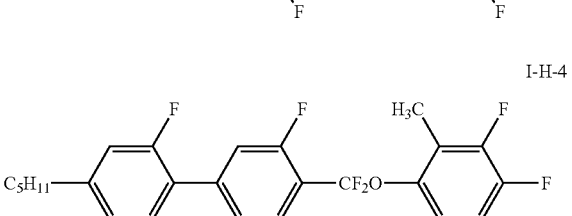
I-I-1 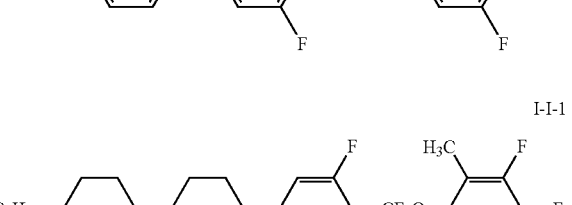
I-I-2 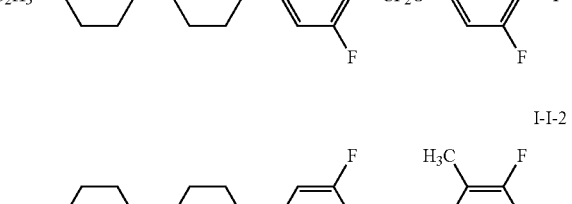
I-I-3 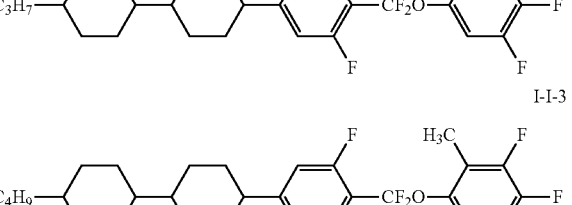
I-I-4 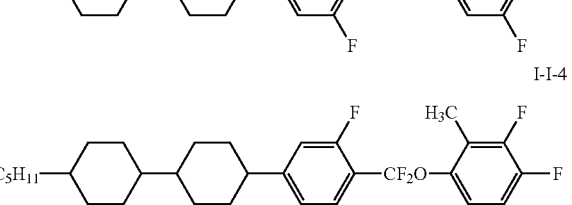
I-J-1 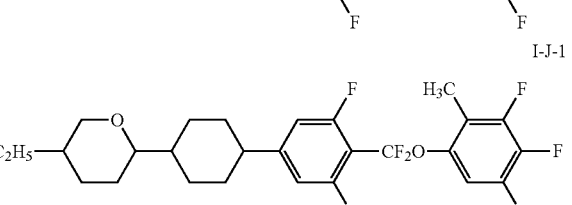

I-J-2
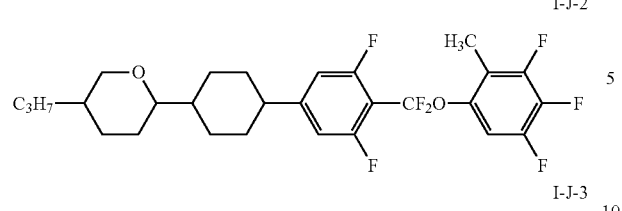
I-J-3
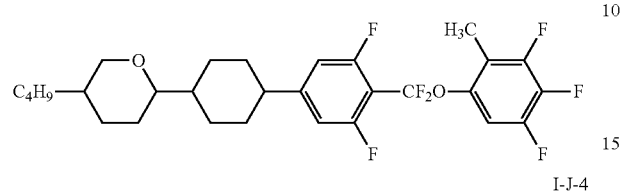
I-J-4
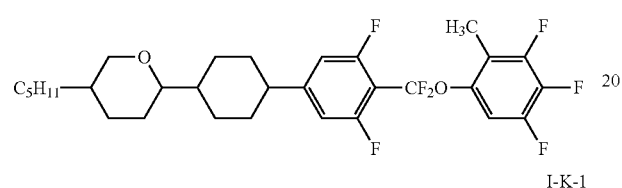
I-K-1
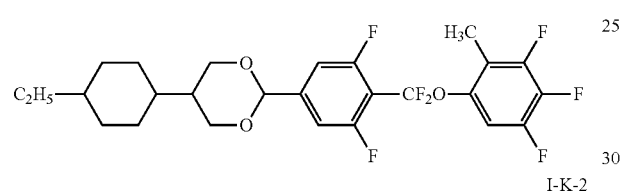
I-K-2
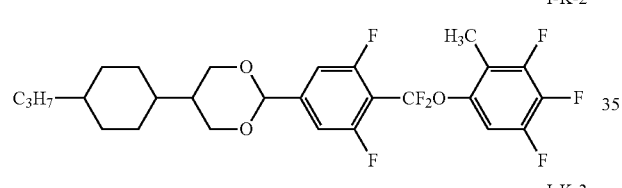
I-K-3
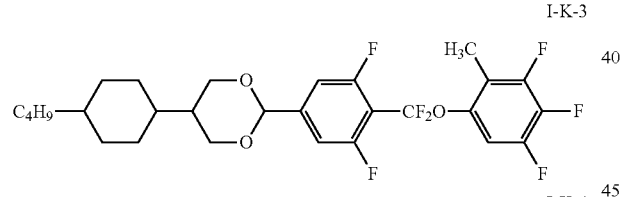
I-K-4
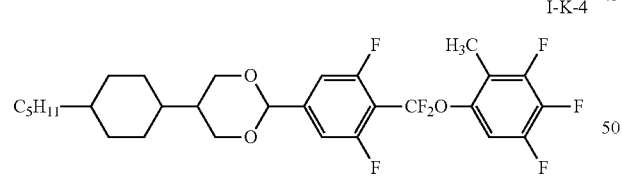
I-L-1
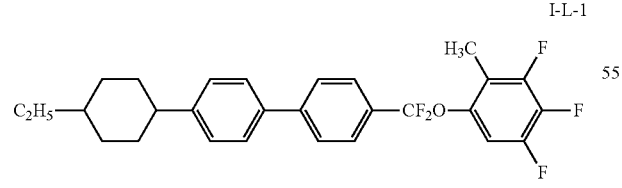
I-L-2
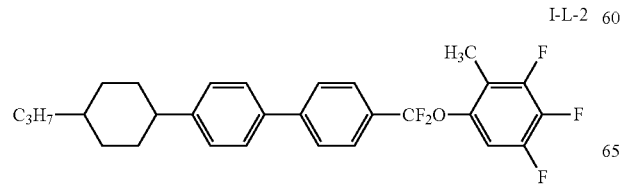
I-L-3
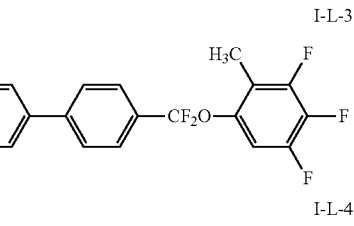
I-L-4
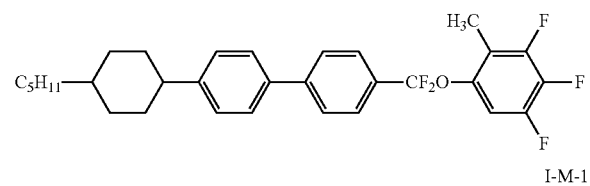
I-M-1
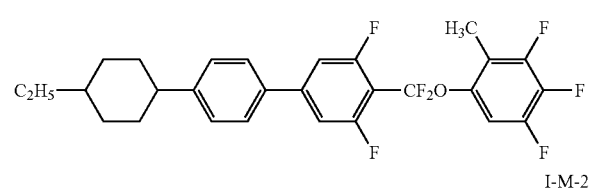
I-M-2
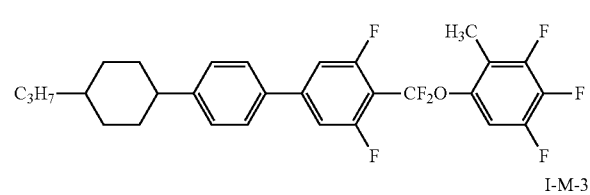
I-M-3
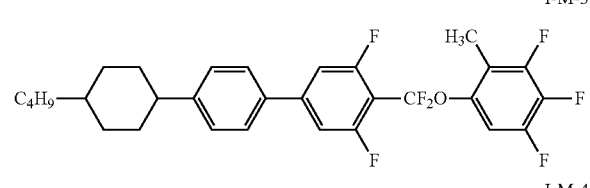
I-M-4
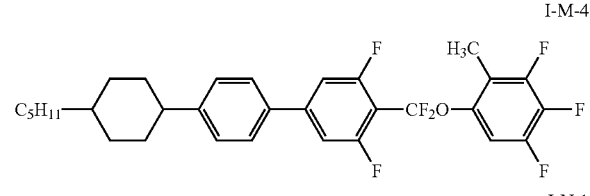
I-N-1
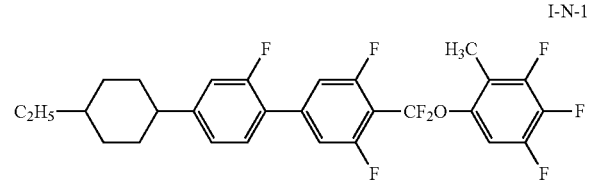
I-N-2
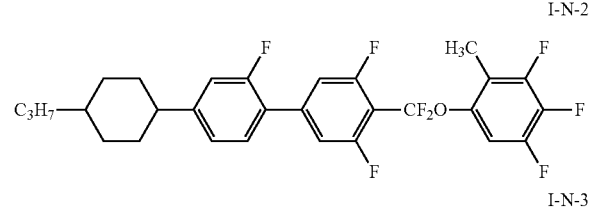
I-N-3

-continued
I-N-4
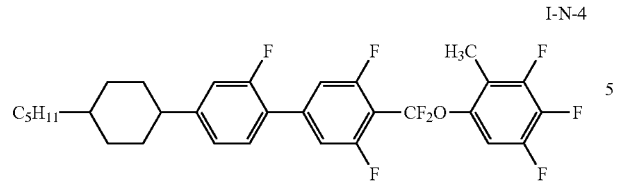
I-O-1
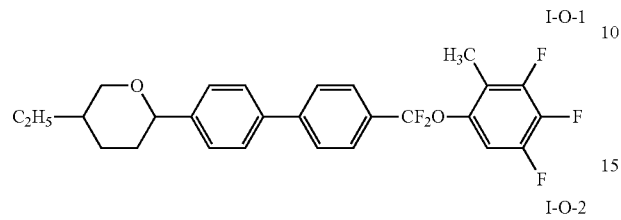
I-O-2
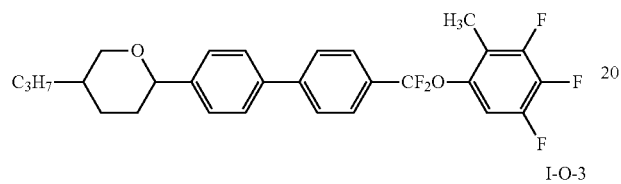
I-O-3
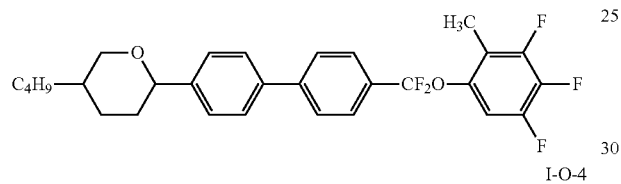
I-O-4
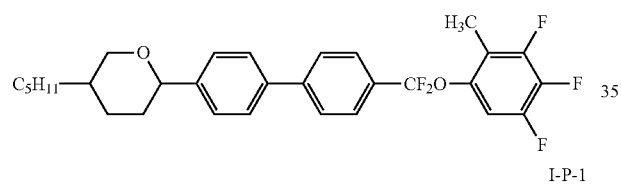
I-P-1
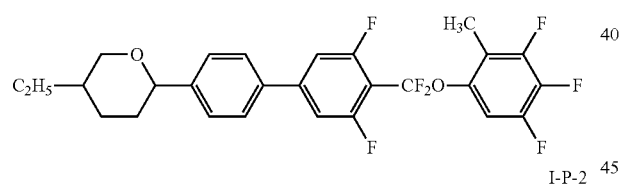
I-P-2
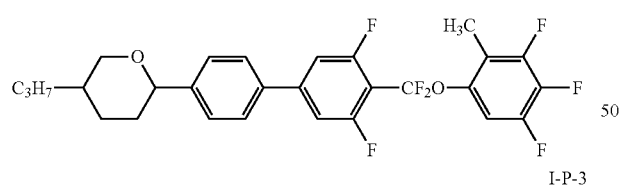
I-P-3
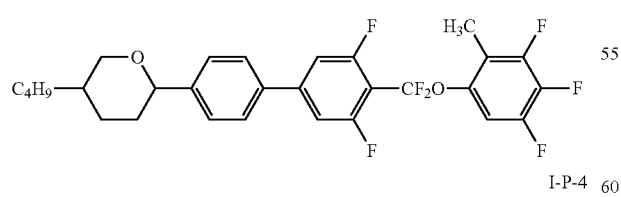
I-P-4
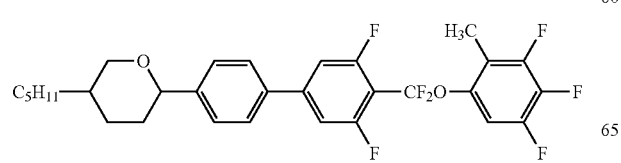
-continued
I-Q-1
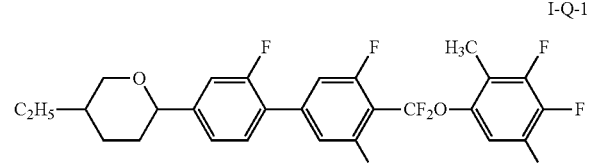
I-Q-2
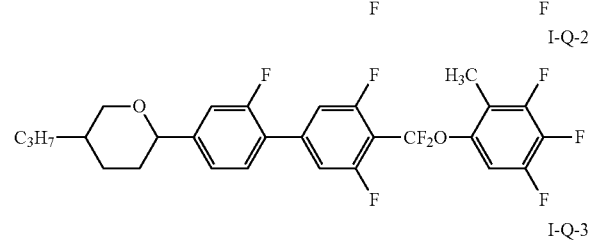
I-Q-3
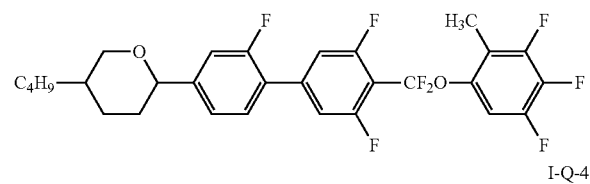
I-Q-4
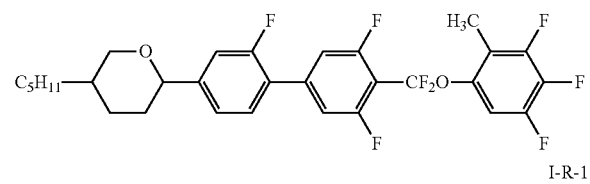
I-R-1
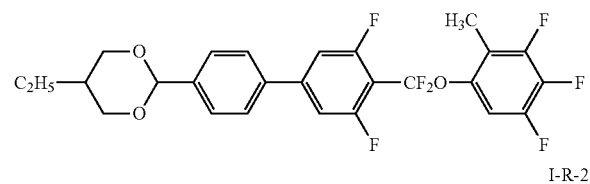
I-R-2
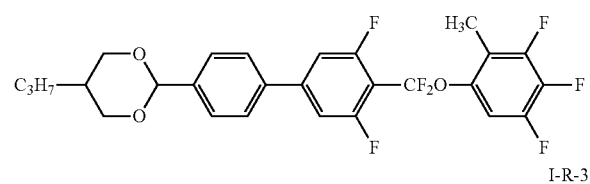
I-R-3
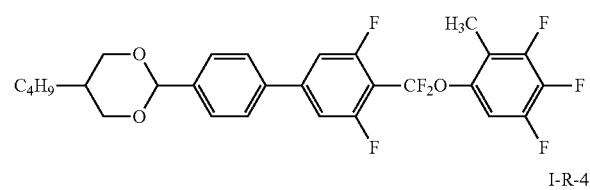
I-R-4
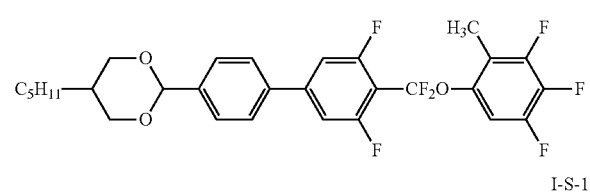
I-S-1
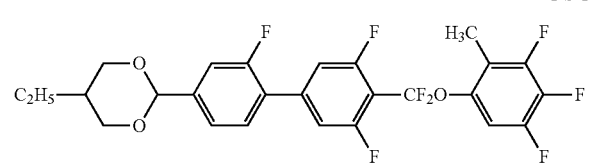

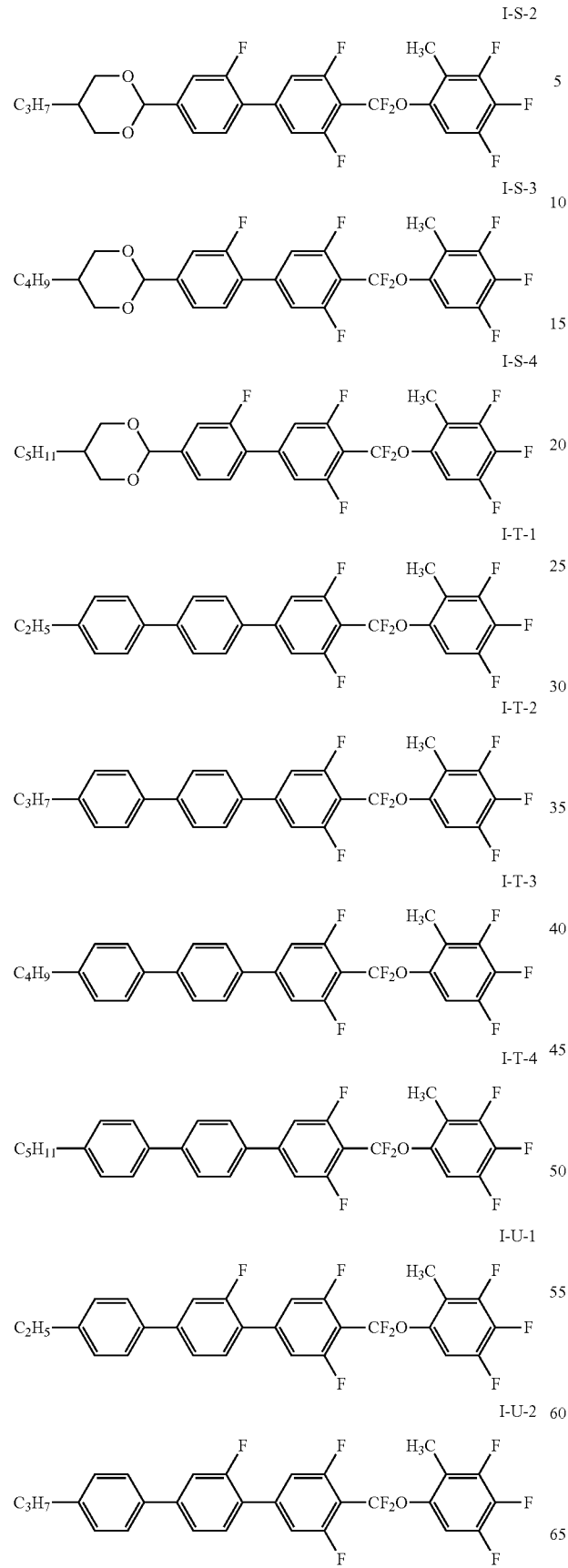
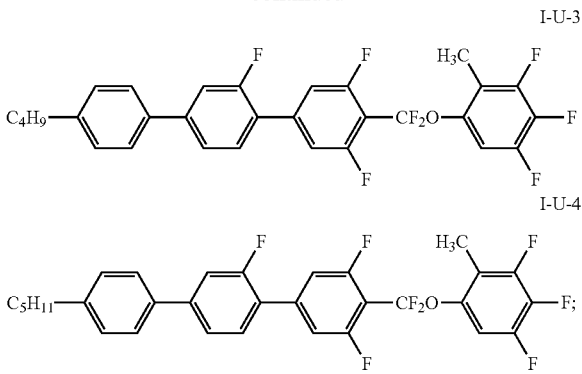
the compound represented by general formula II is selected from one or more of formulas II-A-1 to II-D-16:
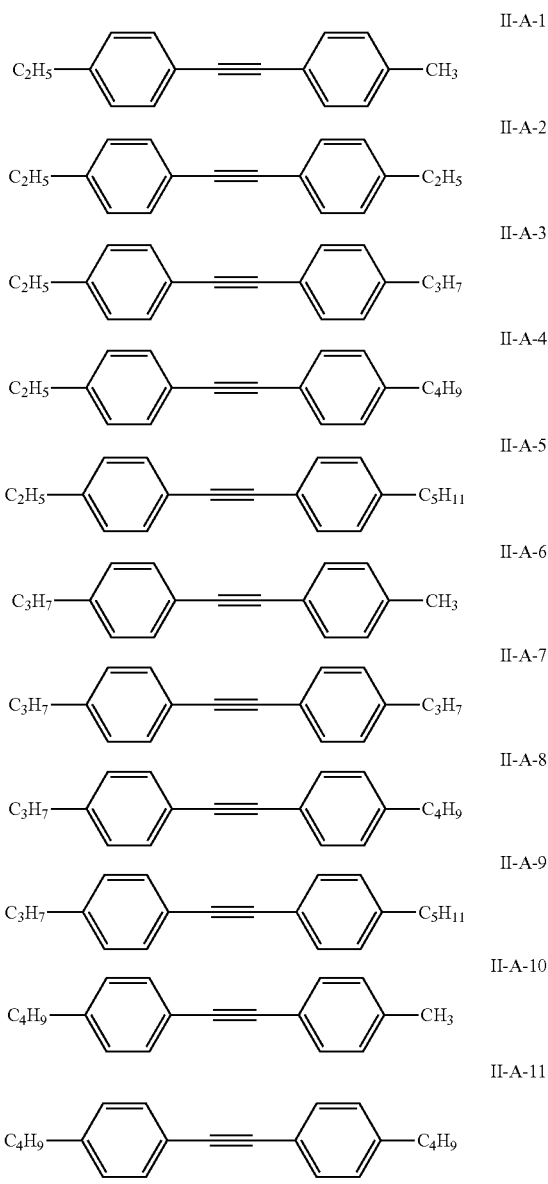

| Compound | Structure |
|---|---|
| II-A-12 | C₄H₉–C₆H₄–C≡C–C₆H₄–C₅H₁₁ |
| II-A-13 | C₅H₁₁–C₆H₄–C≡C–C₆H₄–CH₃ |
| II-A-14 | C₅H₁₁–C₆H₄–C≡C–C₆H₄–C₅H₁₁ |
| II-A-15 | C₂H₅–C₆H₄–C≡C–C₆H₄–OCH₃ |
| II-A-16 | C₃H₇–C₆H₄–C≡C–C₆H₄–OCH₃ |
| II-A-17 | C₄H₉–C₆H₄–C≡C–C₆H₄–OCH₃ |
| II-A-18 | C₅H₁₁–C₆H₄–C≡C–C₆H₄–OCH₃ |
| II-A-19 | C₂H₅–C₆H₄–C≡C–C₆H₄–OC₂H₅ |
| II-A-20 | C₃H₇–C₆H₄–C≡C–C₆H₄–OC₂H₅ |
| II-A-21 | C₄H₉–C₆H₄–C≡C–C₆H₄–OC₂H₅ |
| II-A-22 | C₅H₁₁–C₆H₄–C≡C–C₆H₄–OC₂H₅ |
| II-A-23 | C₂H₅–C₆H₄–C≡C–C₆H₄–OC₃H₇ |
| II-A-24 | C₃H₇–C₆H₄–C≡C–C₆H₄–OC₃H₇ |
| II-A-25 | C₄H₉–C₆H₄–C≡C–C₆H₄–OC₃H₇ |
| II-A-26 | C₅H₁₁–C₆H₄–C≡C–C₆H₄–OC₃H₇ |
| II-A-27 | C₂H₅–C₆H₄–C≡C–C₆H₄–OC₄H₉ |
| II-A-28 | C₃H₇–C₆H₄–C≡C–C₆H₄–OC₄H₉ |
| II-A-29 | C₄H₉–C₆H₄–C≡C–C₆H₄–OC₄H₉ |
| II-A-30 | C₅H₁₁–C₆H₄–C≡C–C₆H₄–OC₄H₉ |
| II-A-31 | CH₂=CH–CH₂–CH₂–C₆H₄–C≡C–C₆H₄–CH₃ |
| II-A-32 | CH₂=CH–CH₂–CH₂–C₆H₄–C≡C–C₆H₄–C₂H₅ |
| II-A-33 | CH₂=CH–CH₂–CH₂–C₆H₄–C≡C–C₆H₄–C₃H₇ |
| II-A-34 | CH₂=CH–CH₂–CH₂–C₆H₄–C≡C–C₆H₄–C₄H₉ |
| II-A-35 | CH₂=CH–CH₂–CH₂–C₆H₄–C≡C–C₆H₄–CH₂–CH₂–CH=CH₂ |
| II-B-1 | C₂H₅–C₆H₄–C≡C–C₆H₃(3,4-F₂) |
| II-B-2 | C₃H₇–C₆H₄–C≡C–C₆H₃(3,4-F₂) |
| II-B-3 | C₄H₉–C₆H₄–C≡C–C₆H₃(3,4-F₂) |
| II-B-4 | C₅H₁₁–C₆H₄–C≡C–C₆H₃(3,4-F₂) |
| II-C-1 | C₂H₅–C₆H₁₀–C₆H₄–C≡C–C₆H₄–CH₃ |

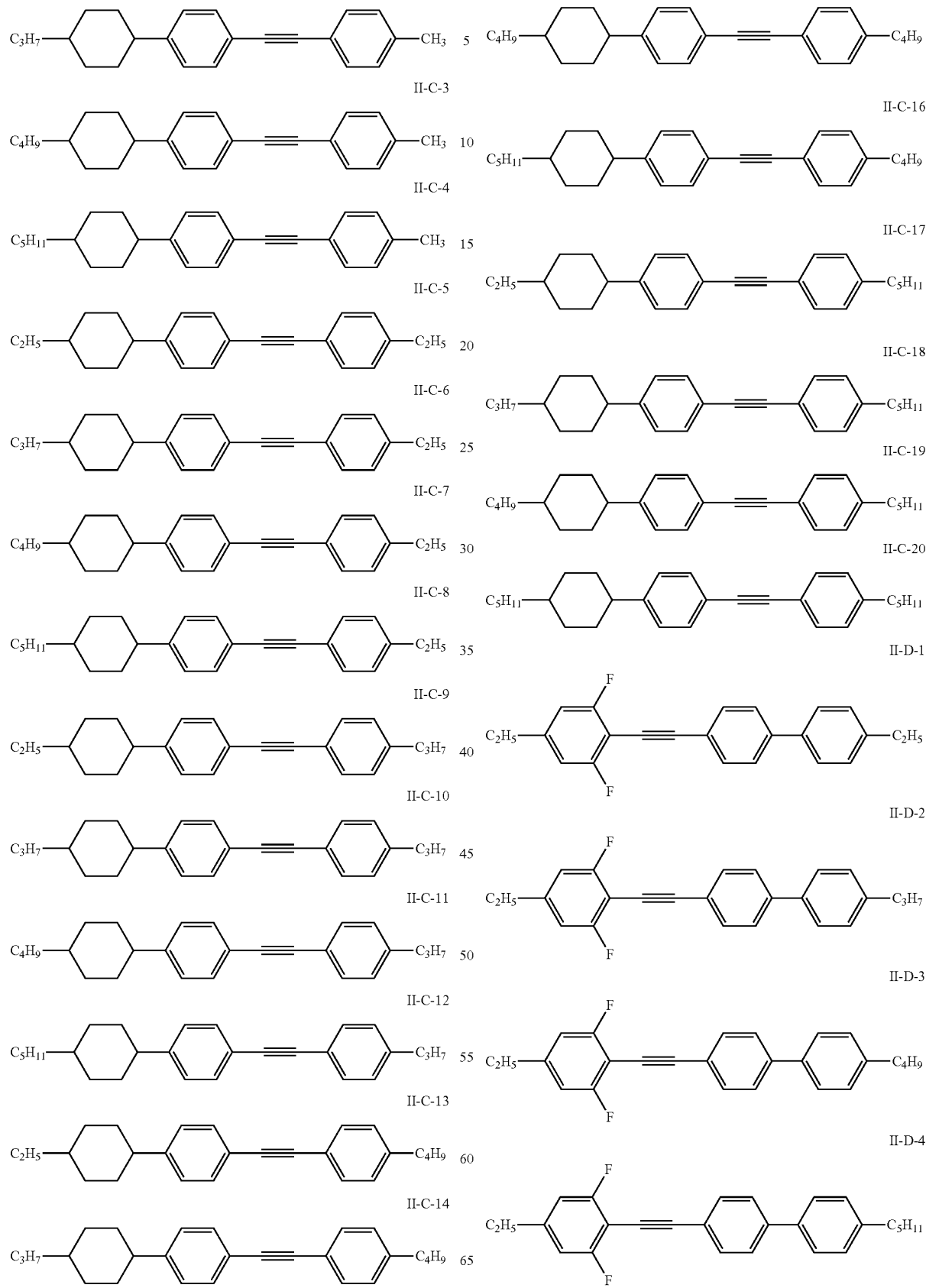

-continued and the compound represented by general formula III is selected from one or more of the compounds represented by formulas III-A-1 to III-C-24:

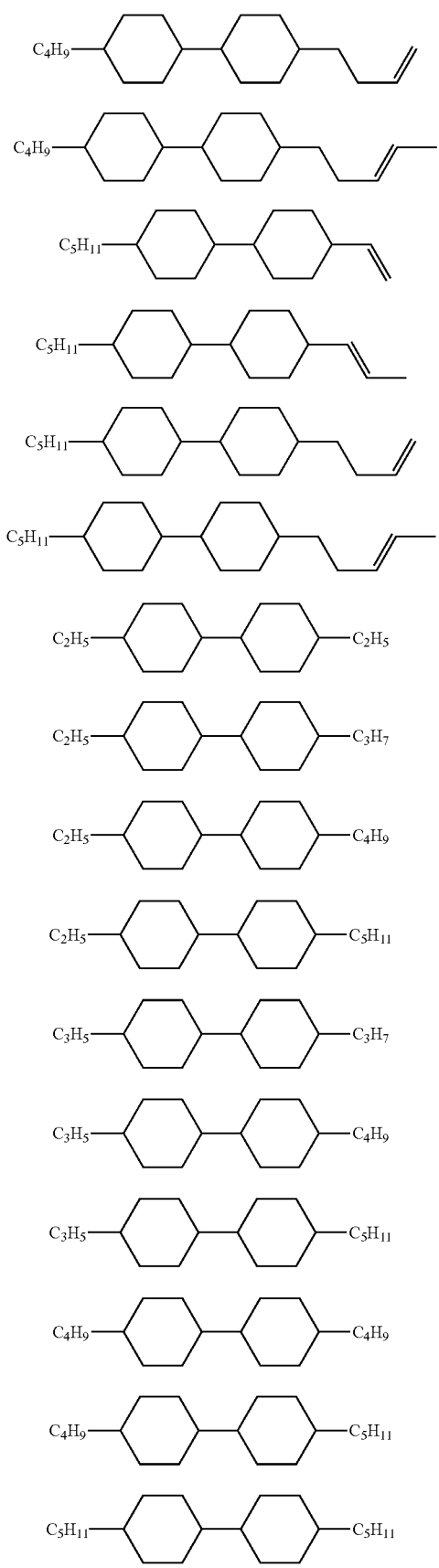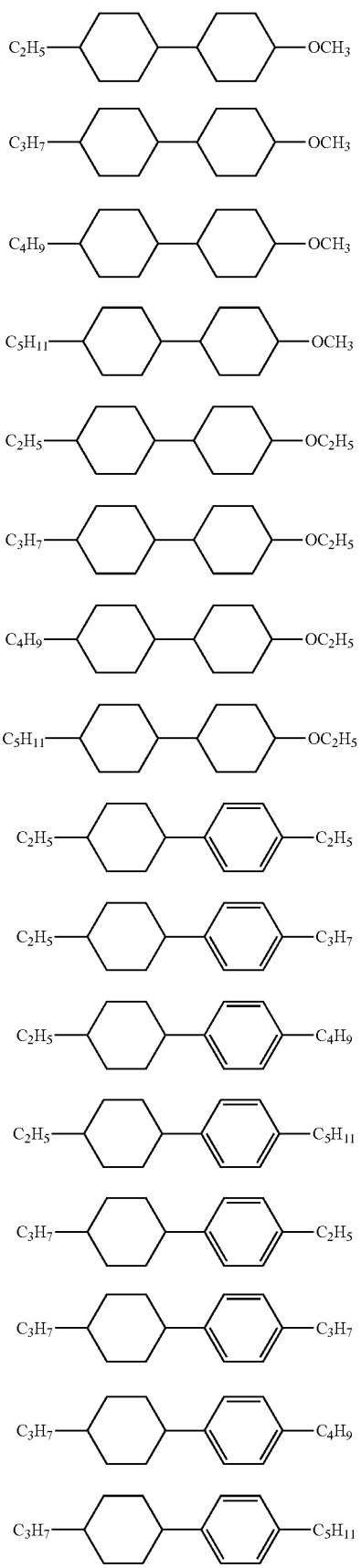

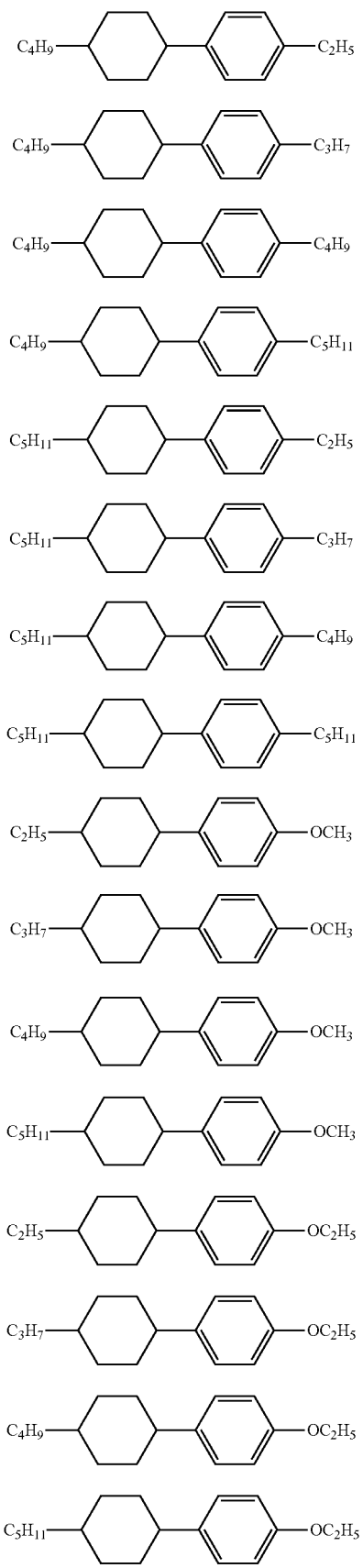
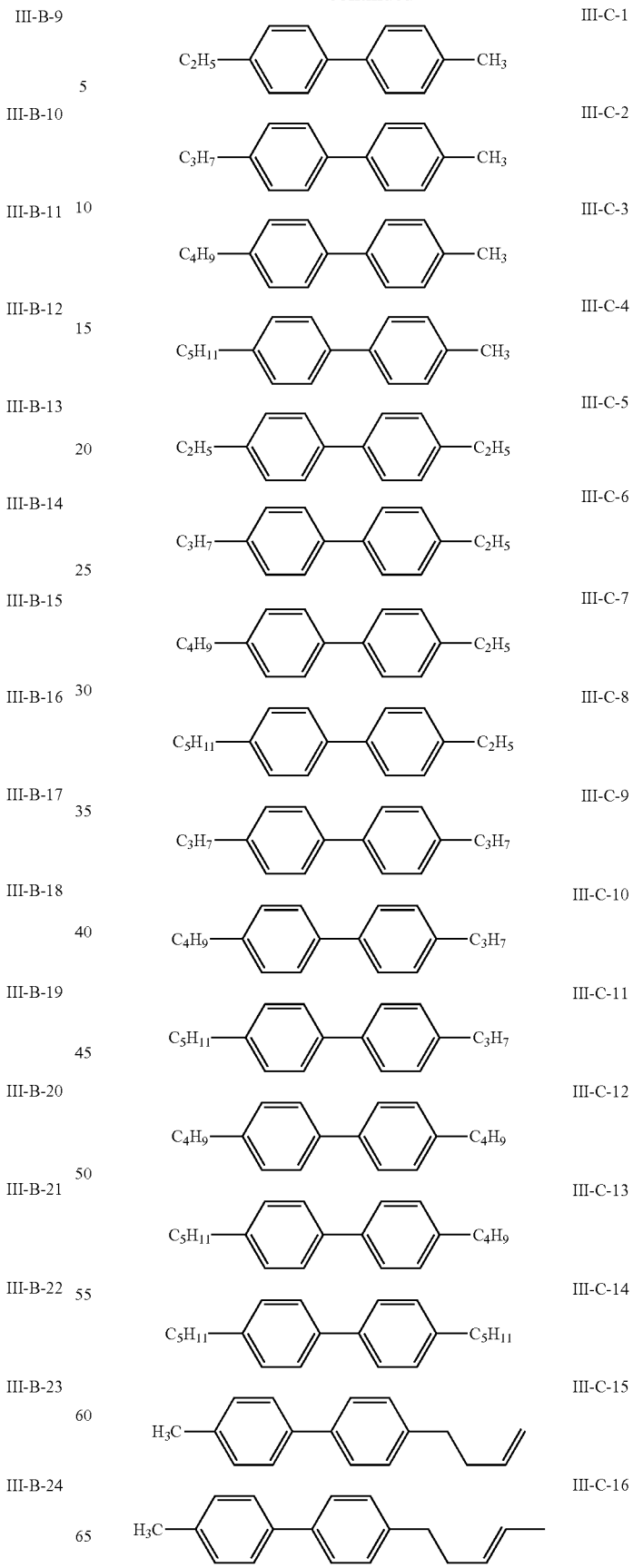

-continued
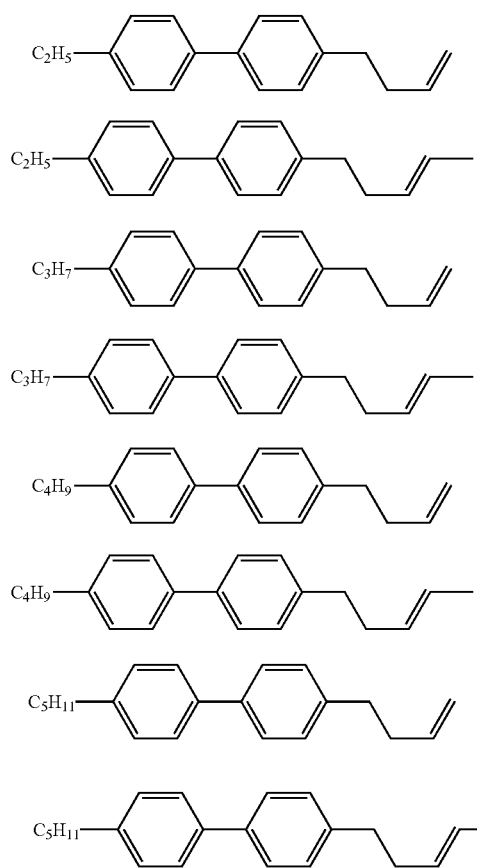
8. The liquid crystal composition according to claim 2, wherein the compound represented by general formula IV is selected from one or more of the structures of formulas IV-A-1 to IV-C-30:
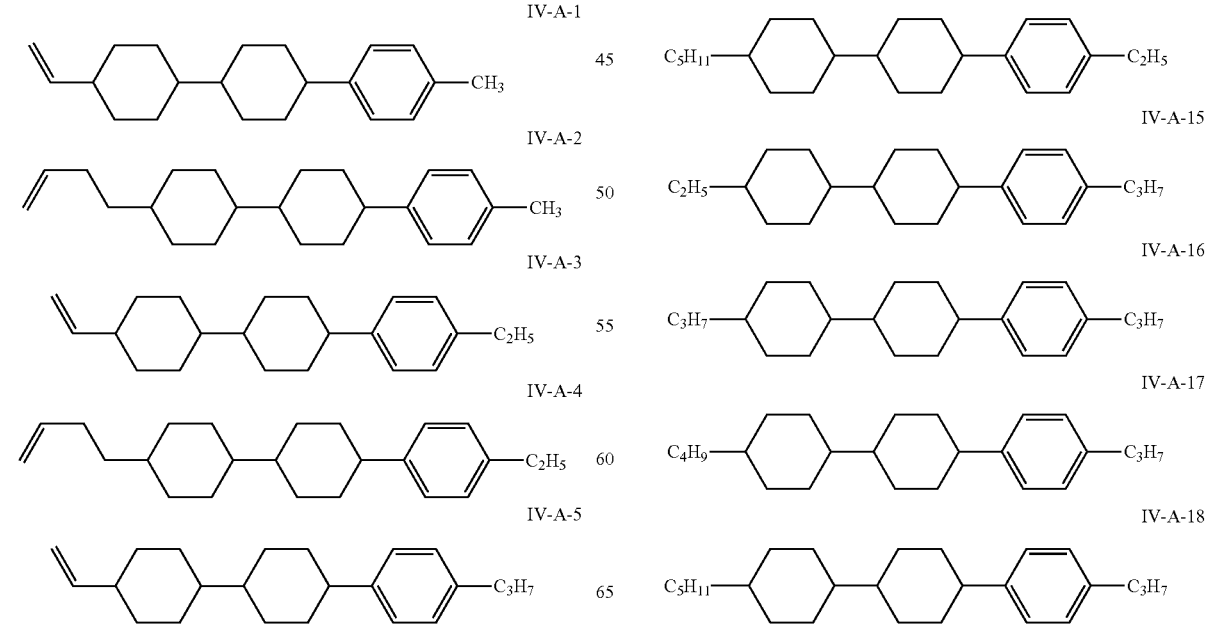

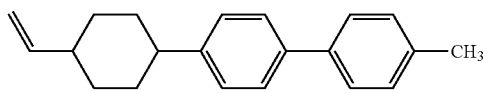 IV-B-1
 IV-B-2
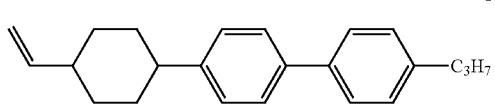 IV-B-3
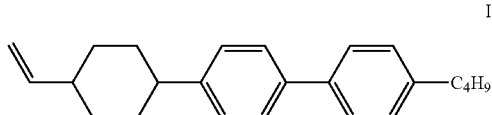 IV-B-4
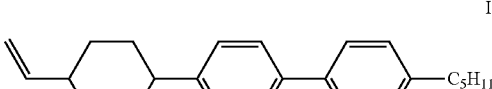 IV-B-5
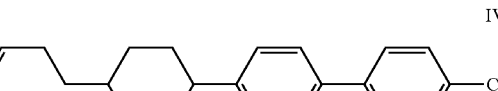 IV-B-6
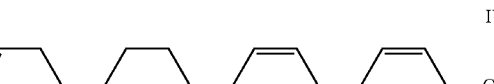 IV-B-7
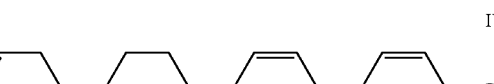 IV-B-8
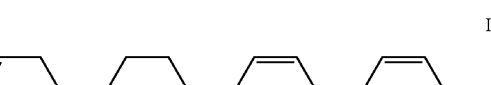 IV-B-9
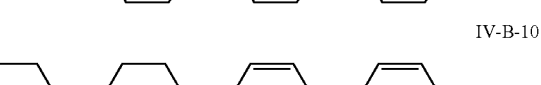 IV-B-10
 IV-B-11
 IV-B-12
 IV-B-13
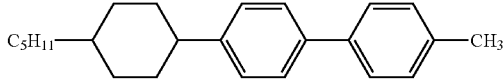 IV-B-14
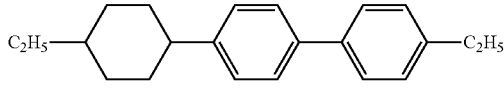 IV-B-15
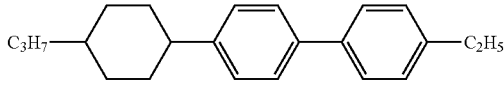 IV-B-16
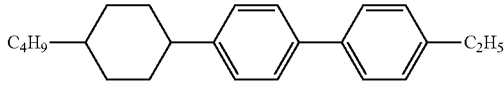 IV-B-17
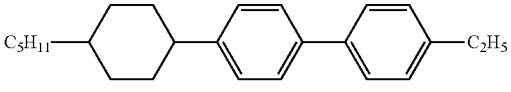 IV-B-18
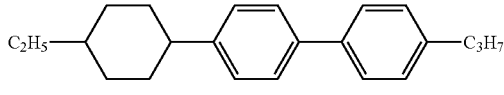 IV-B-19
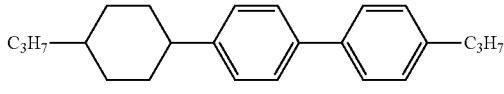 IV-B-20
 IV-B-21
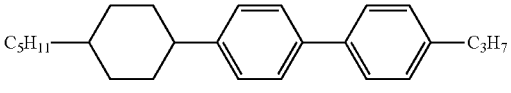 IV-B-22
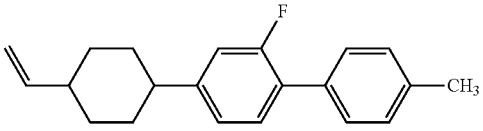 IV-C-1
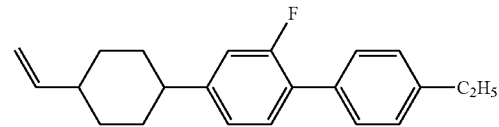 IV-C-2
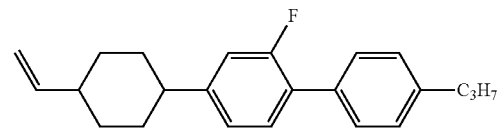 IV-C-3

IV-C-4
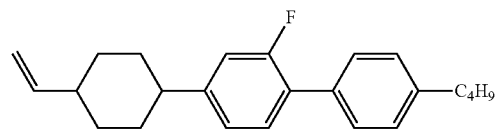
IV-C-5
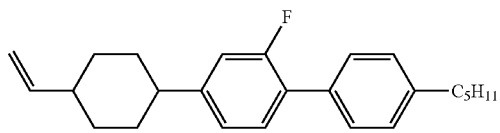
IV-C-6
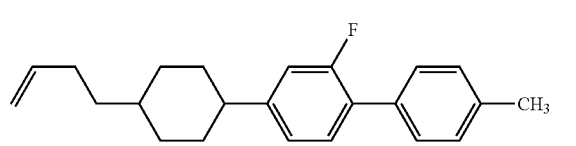
IV-C-7
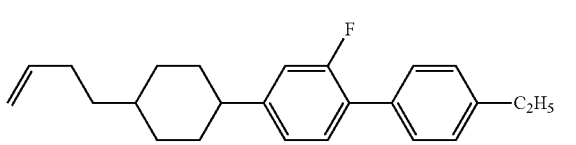
IV-C-8
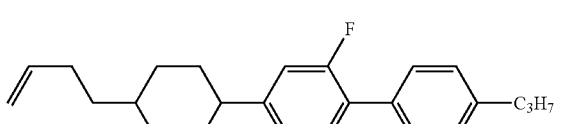
IV-C-9
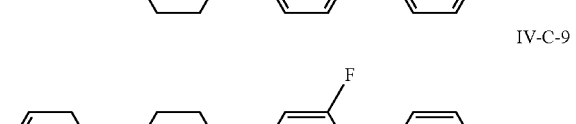
IV-C-10
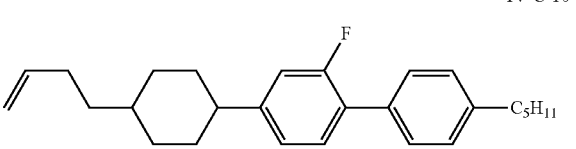
IV-C-11
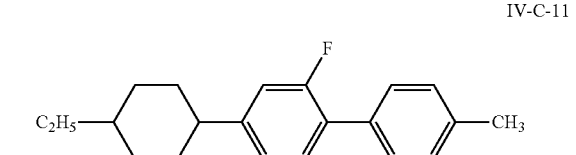
IV-C-12
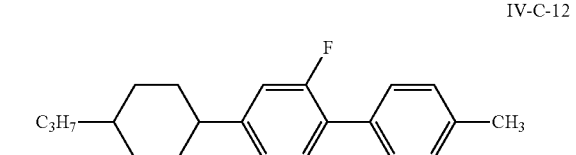
IV-C-13
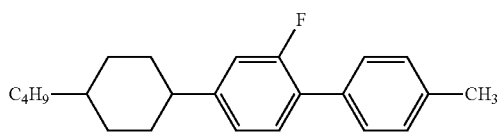
IV-C-14
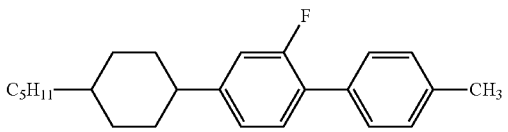
IV-C-15
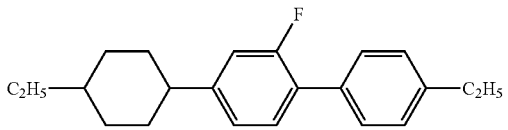
IV-C-16
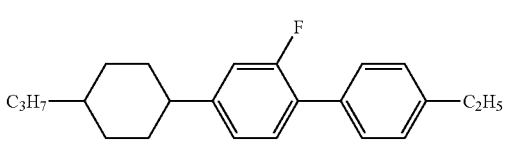
IV-C-17
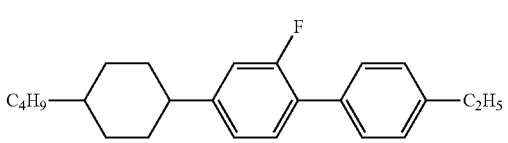
IV-C-18
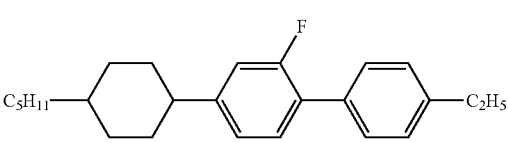
IV-C-19
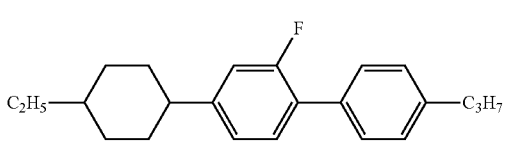
IV-C-20
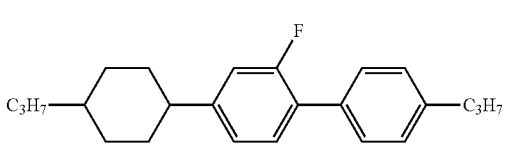
IV-C-21
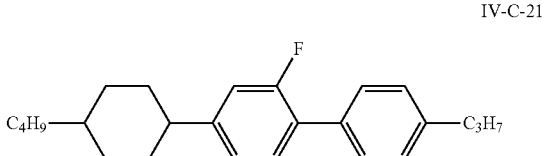
IV-C-22
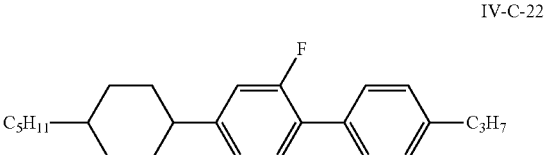
IV-C-23
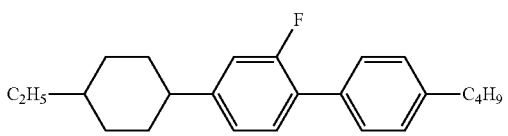

-continued
IV-C-24
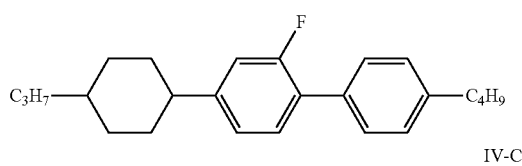
IV-C-25
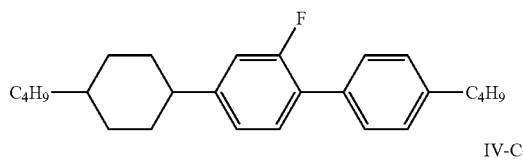
IV-C-26
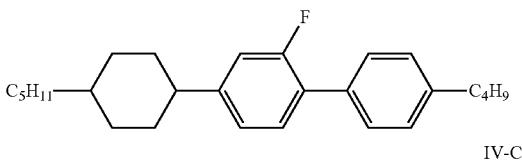
IV-C-27
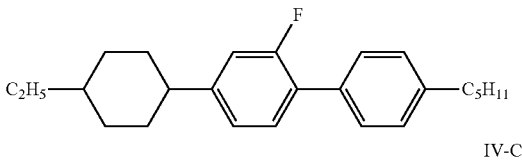
IV-C-28
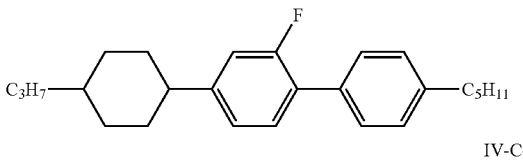
IV-C-29
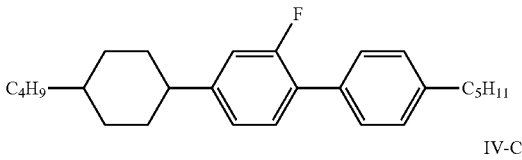
IV-C-30
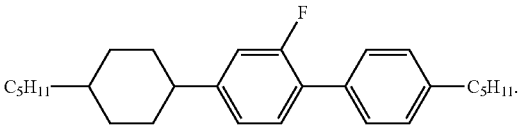
9. The liquid crystal composition according claim 3, wherein the compounds of general formulas V to IX are selected from one or more of the formulas V-A to IX-N:
V-A
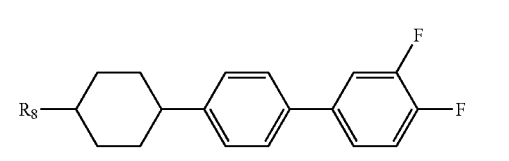
V-B
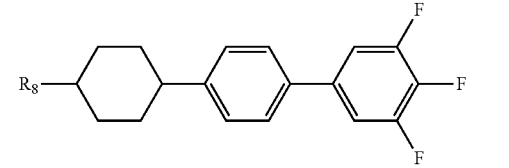
-continued
V-C
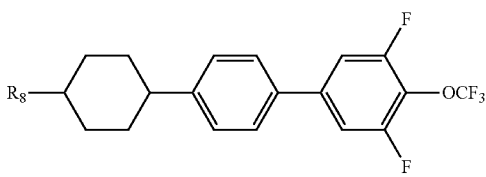
V-D
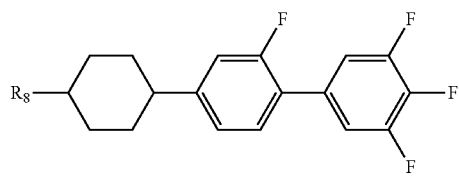
V-E
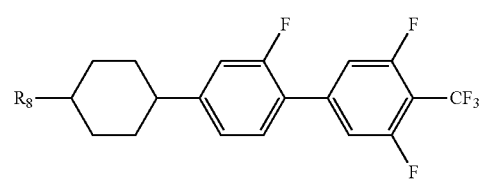
V-F
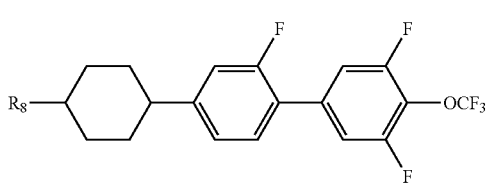
VI-A
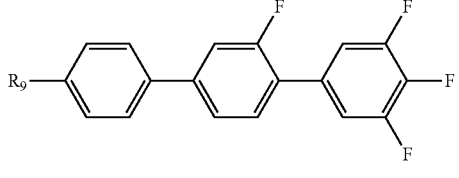
VI-B
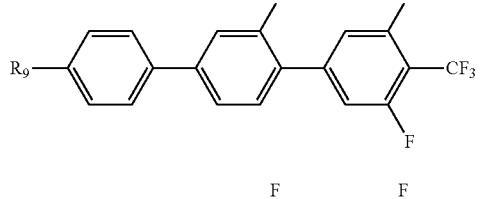
VI-C
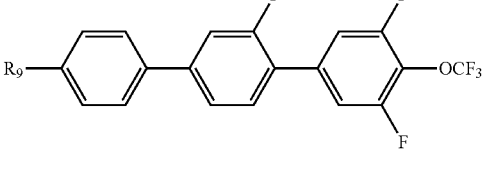
VII-A
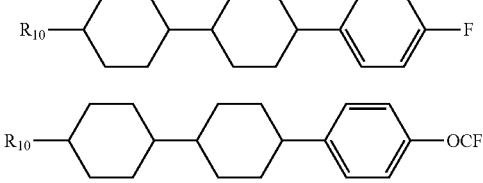
VII-B
VII-C
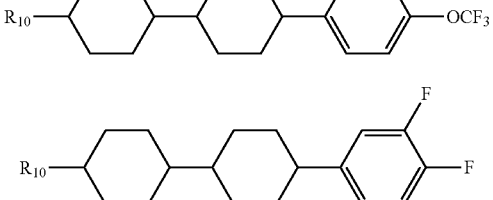

VII-D
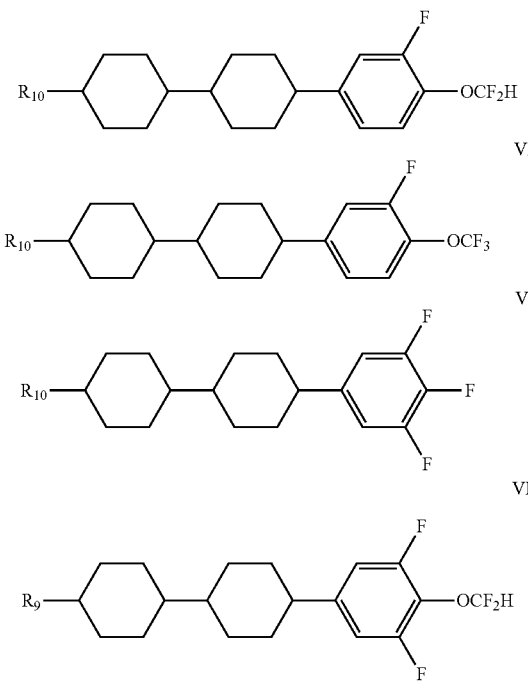
VII-E
VII-F
VII-G
VII-H
VII-I
VIII-A
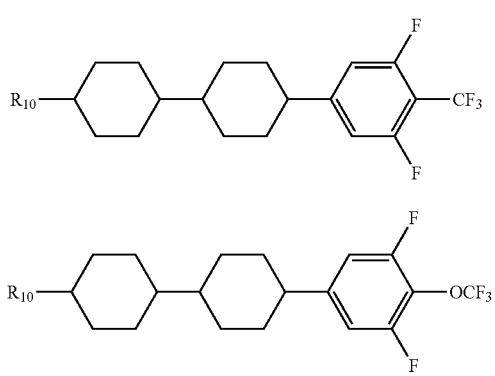
VIII-B
IX-A
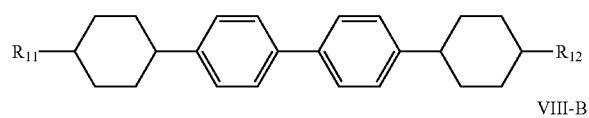
IX-B
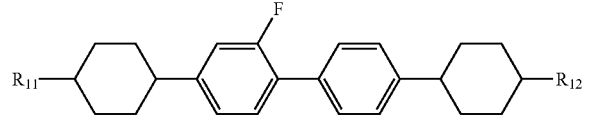
IX-C
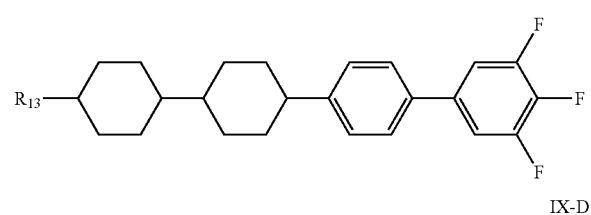
IX-D
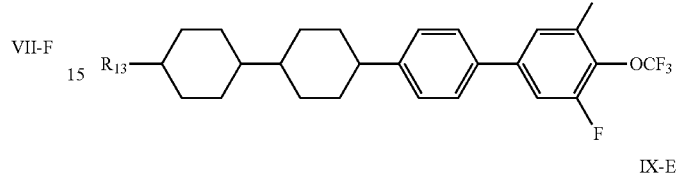
IX-E
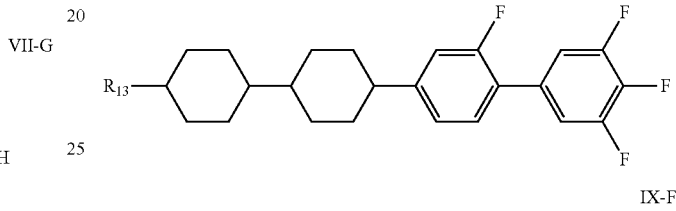
IX-F
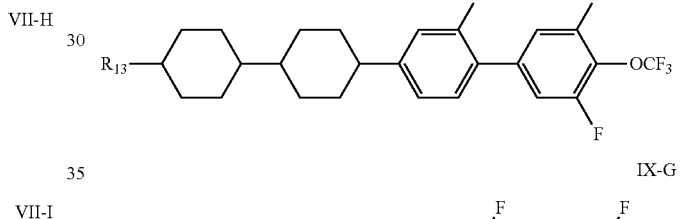
IX-G
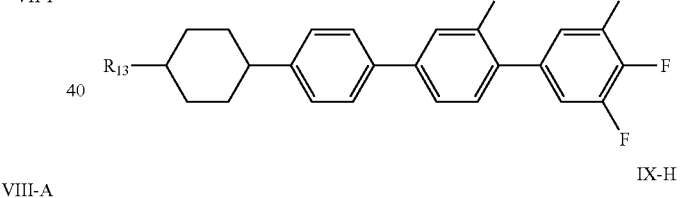
IX-H
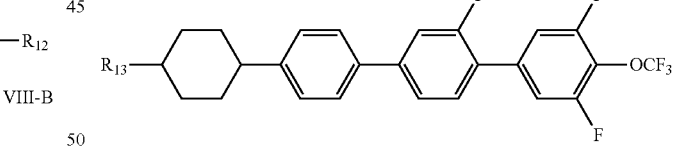
IX-I
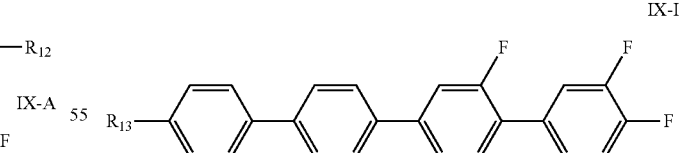
IX-J

IX-K

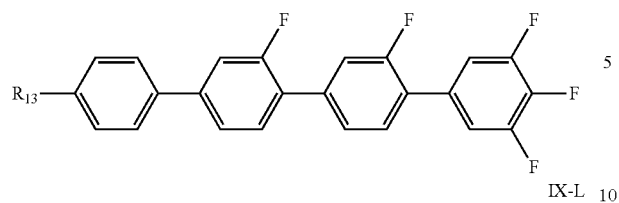

IX-L

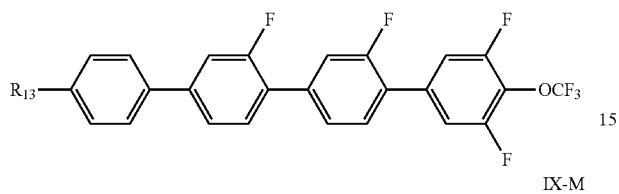

IX-M

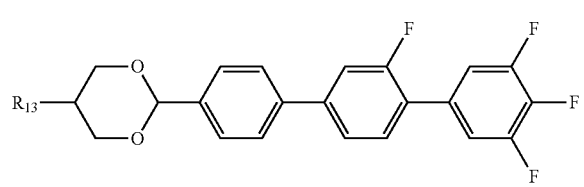

IX-N

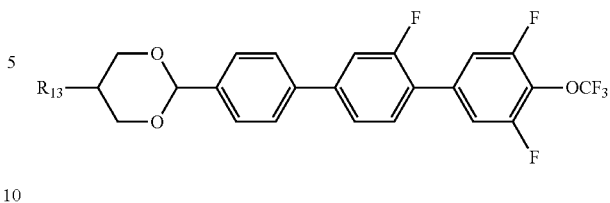

wherein $R_{10}$ independently represents a $C_2$-$C_7$ linear alkyl group or linear alkenyl group; and $R_8$, $R_9$ and $R_{11}$-$R_{13}$ each independently represent a $C_2$-$C_7$ linear alkyl group.

10. The liquid crystal composition of claim 1, comprising, in percentages by weight, 9-30% of the one or more compounds represented by the general formula I, 3-26% of the one or more compounds represented by the general formula II, and 36-67% of the one or more compounds represented by the general formula III.

* * * * *